(12) United States Patent
Elshafie et al.

(10) Patent No.: US 12,245,147 B2
(45) Date of Patent: Mar. 4, 2025

(54) COMMUNICATIONS IN POWER SAVING MODE

(71) Applicant: QUALCOMM Incorporated, San Diego, CA (US)

(72) Inventors: Ahmed Elshafie, San Diego, CA (US); Muhammad Sayed Khairy Abdelghaffar, San Jose, CA (US); Ahmed Attia Abotabl, San Diego, CA (US); Hung Dinh Ly, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 573 days.

(21) Appl. No.: 17/644,216

(22) Filed: Dec. 14, 2021

(65) Prior Publication Data
US 2023/0189140 A1    Jun. 15, 2023

(51) Int. Cl.
*H04W 52/02* (2009.01)
*H04L 1/1829* (2023.01)
*H04W 72/21* (2023.01)
*H04W 72/23* (2023.01)

(52) U.S. Cl.
CPC ....... *H04W 52/0212* (2013.01); *H04L 1/1864* (2013.01); *H04W 52/0229* (2013.01); *H04W 72/21* (2023.01); *H04W 72/23* (2023.01)

(58) Field of Classification Search
CPC ......... H04W 52/0212; H04W 52/0209; H04W 52/0229; H04W 72/21; H04W 72/23; H04W 52/0235; H04W 52/028; H04W 52/0216; Y02D 30/70; H04L 1/1864
See application file for complete search history.

(56) References Cited

U.S. PATENT DOCUMENTS

| | | | |
|---|---|---|---|
| 2011/0103331 A1* | 5/2011 | Kuo | H04L 5/0089 370/329 |
| 2020/0267652 A1* | 8/2020 | Choi | H04L 1/1819 |
| 2020/0275369 A1* | 8/2020 | Foster | H04W 52/0225 |
| 2021/0051759 A1* | 2/2021 | Zhou | H04W 76/11 |

OTHER PUBLICATIONS

International Search Report and Written Opinion—PCT/US2022/080219—ISA/EPO—Mar. 17, 2023.

* cited by examiner

*Primary Examiner* — Fred A Casca
(74) *Attorney, Agent, or Firm* — Kevin M. Donnelly; Harrity & Harrity, LLP

(57) ABSTRACT

Various aspects of the present disclosure generally relate to wireless communication. In some aspects, a user equipment (UE) may receive an indication of a power saving mode of a base station. The UE may communicate with the base station based at least in part on the power saving mode, the communicating comprising one or more of: monitoring for a wake-up signal with a periodicity that is based at least in part on the power saving mode, transmitting uplink control information via control channel resources that are based at least in part on the power saving mode, or transmitting or receiving one or more communications via a set of component carriers that are based at least in part on the power saving mode. Numerous other aspects are provided.

30 Claims, 10 Drawing Sheets

COMMUNICATIONS IN POWER SAVING MODE

FIELD OF THE DISCLOSURE

Aspects of the present disclosure generally relate to wireless communication and specifically, to techniques and apparatuses for communicating while in a power saving mode.

BACKGROUND

Wireless communication systems are widely deployed to provide various telecommunication services such as telephony, video, data, messaging, and broadcasts. Typical wireless communication systems may employ multiple-access technologies capable of supporting communication with multiple users by sharing available system resources (for example, bandwidth or transmit power). Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, time division synchronous code division multiple access (TD-SCDMA) systems, and Long Term Evolution (LTE). LTE/LTE-Advanced is a set of enhancements to the Universal Mobile Telecommunications System (UMTS) mobile standard promulgated by the Third Generation Partnership Project (3GPP).

The above multiple access technologies have been adopted in various telecommunication standards to provide a common protocol that enables different UEs to communicate on a municipal, national, regional, or global level. New Radio (NR), which may be referred to as 5G, is a set of enhancements to the LTE mobile standard promulgated by the 3GPP. NR is designed to better support mobile broadband internet access by improving spectral efficiency, lowering costs, improving services, making use of new spectrum, and better integrating with other open standards using orthogonal frequency division multiplexing (OFDM) with a cyclic prefix (CP) (CP-OFDM) on the downlink, using CP-OFDM or single-carrier frequency division multiplexing (SC-FDM) (also known as discrete Fourier transform spread OFDM (DFT-s-OFDM)) on the uplink, as well as supporting beamforming, multiple-input multiple-output (MIMO) antenna technology, and carrier aggregation. As the demand for mobile broadband access continues to increase, further improvements in LTE, NR, and other radio access technologies remain useful.

In some networks, network devices such as base stations may manage wireless communications using an unnecessary amount of power consumption. In some networks, the network devices may have power constraints that limit an amount of power resources available to the network devices to manage the wireless communications. The network devices may support changing communication parameters that are associated with different power consumption rates based at least in part on power constraints or a determination that power consumption can be reduced while managing current wireless communications, among other examples. A base station may indicate, to a UE, values of the communication parameters to apply to a subsequent communication based at least in part on a power consumption rate. However, indicating the values for the communication parameters consumes communication, computing, network, or power resources of the UE or the base station. Additionally or alternatively, dynamic signaling, such as a downlink control information message, may have limited information fields for carrying the values for the communication parameters for the subsequent communication. In this way, the base station may be unable to realize potential power saving that the base station may otherwise support.

SUMMARY

Some aspects described herein relate to a method of wireless communication performed by a user equipment (UE). The method may include receiving an indication of a power saving mode of a base station. The method may include communicating with the base station based at least in part on the power saving mode, the communicating comprising one or more of: monitoring for a wake-up signal with a periodicity that is based at least in part on the power saving mode, transmitting uplink control information via control channel resources that are based at least in part on the power saving mode, or transmitting or receiving one or more communications via a set of component carriers that are based at least in part on the power saving mode.

Some aspects described herein relate to a method of wireless communication performed by a base station. The method may include transmitting an indication of a power saving mode of the base station for communicating with a UE. The method may include communicating with the UE based at least in part on the power saving mode, the communicating comprising one or more of: transmitting a wake-up signal via resources having a periodicity that is based at least in part on the power saving mode, receiving uplink control information via control channel resources that are based at least in part on the power saving mode, or transmitting or receiving one or more communications via a set of component carriers that are based at least in part on the power saving mode.

Some aspects described herein relate to a UE for wireless communication. The user equipment may include at least one processor and at least one memory, communicatively coupled with the at least one processor, that stores processor-readable code. The processor-readable code, when executed by the at least one processor, may be configured to cause the user equipment to receive an indication of a power saving mode of a base station. The processor-readable code, when executed by the at least one processor, may be configured to cause the user equipment to communicate with the base station based at least in part on the power saving mode. The communicating comprises one or more of monitoring for a wake-up signal with a periodicity that is based at least in part on the power saving mode, transmitting uplink control information via control channel resources that are based at least in part on the power saving mode, or transmitting or receiving one or more communications via a set of component carriers that are based at least in part on the power saving mode.

Some aspects described herein relate to a base station for wireless communication. The base station may include at least one processor and at least one memory, communicatively coupled with the at least one processor, that stores processor-readable code. The processor-readable code, when executed by the at least one processor, may be configured to cause the base station to transmit an indication of a power saving mode of the base station for communicating with a UE. The processor-readable code, when executed by the at least one processor, may be configured to cause the base station to communicate with the UE based at least in part on the power saving mode. The communicating comprises one or more of monitoring for a wake-up signal with a periodicity that is based at least in part on the power saving mode, transmitting uplink control information via control channel resources that are based at least in part on the power saving mode, or transmitting or receiving one or more communications via a set of component carriers that are based at least in part on the power saving mode.

Some aspects described herein relate to a non-transitory computer-readable medium that stores a set of instructions for wireless communication by a UE. The set of instructions, when executed by one or more processors of the UE, may cause the UE to receive an indication of a power saving mode of a base station. The set of instructions, when executed by one or more processors of the UE, may cause the UE to communicate with the base station based at least in part on the power saving mode. The communicating comprises one or more of monitoring for a wake-up signal with a periodicity that is based at least in part on the power saving mode, transmitting uplink control information via control channel resources that are based at least in part on the power saving mode, or transmitting or receiving one or more communications via a set of component carriers that are based at least in part on the power saving mode.

Some aspects described herein relate to a non-transitory computer-readable medium that stores a set of instructions for wireless communication by a base station. The set of instructions, when executed by one or more processors of the base station, may cause the base station to transmit an indication of a power saving mode of the base station for communicating with a UE. The set of instructions, when executed by one or more processors of the base station, may cause the base station to communicate with the UE based at least in part on the power saving mode. The communicating comprises one or more of monitoring for a wake-up signal with a periodicity that is based at least in part on the power saving mode, transmitting uplink control information via control channel resources that are based at least in part on the power saving mode, or transmitting or receiving one or more communications via a set of component carriers that are based at least in part on the power saving mode.

Some aspects described herein relate to an apparatus for wireless communication. The apparatus may include means for receiving an indication of a power saving mode of a base station. The apparatus may include means for communicating with the base station based at least in part on the power saving mode, the communicating comprising one or more of: means for monitoring for a wake-up signal with a periodicity that is based at least in part on the power saving mode, means for transmitting uplink control information via control channel resources that are based at least in part on the power saving mode, or means for transmitting or receiving one or more communications via a set of component carriers that are based at least in part on the power saving mode.

Some aspects described herein relate to an apparatus for wireless communication. The apparatus may include means for transmitting an indication of a power saving mode of the apparatus for communicating with a UE. The apparatus May include means for communicating with the UE based at least in part on the power saving mode, the communicating comprising one or more of: means for transmitting a wake-up signal via resources having a periodicity that is based at least in part on the power saving mode, means for receiving uplink control information via control channel resources that are based at least in part on the power saving mode, or means for transmitting or receiving one or more communications via a set of component carriers that are based at least in part on the power saving mode.

Aspects generally include a method, apparatus, system, computer program product, non-transitory computer-readable medium, user equipment, base station, wireless communication device, or processing system as substantially described with reference to and as illustrated by the drawings and specification.

The foregoing has outlined rather broadly the features and technical advantages of examples in accordance with the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages will be better understood from the following description when considered in connection with the accompanying figures. Each of the figures is provided for the purposes of illustration and description, and not as a definition of the limits of the claims.

BRIEF DESCRIPTION OF THE DRAWINGS

So that the above-recited features of the present disclosure can be understood in detail, a more particular description, briefly summarized above, may be had by reference to aspects, some of which are illustrated in the appended drawings. It is to be noted, however, that the appended drawings illustrate only some typical aspects of this disclosure and are therefore not to be considered limiting of its scope, for the description may admit to other equally effective aspects. The same reference numbers in different drawings may identify the same or similar elements.

DETAILED DESCRIPTION

Figure 1:
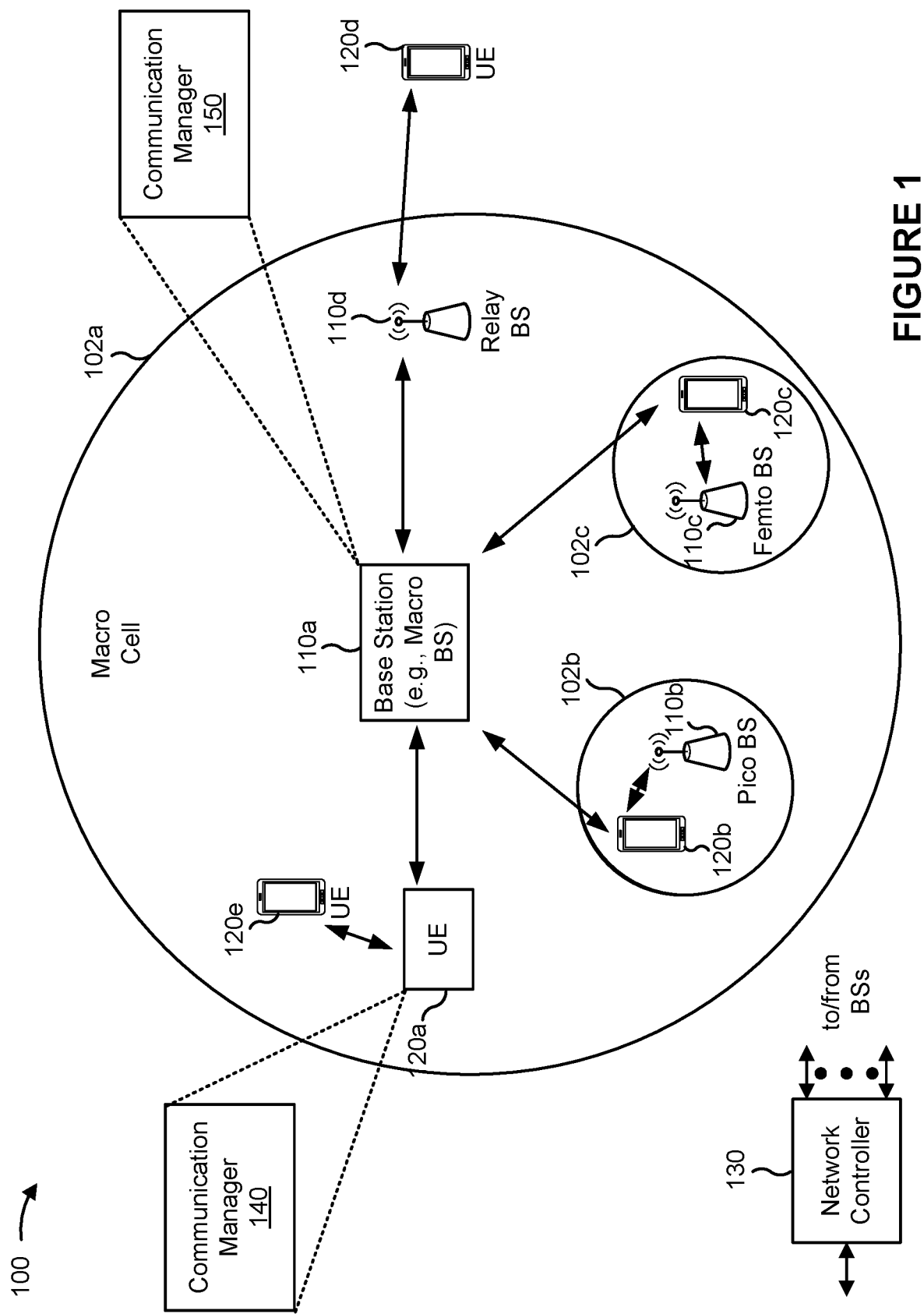
FIG. 1 is a diagram illustrating an example of a wireless network in accordance with the present disclosure.

Various aspects of the disclosure are described more fully hereinafter with reference to the accompanying drawings.

This disclosure may, however, be embodied in many different forms and are not to be construed as limited to any specific structure or function presented throughout this disclosure. Rather, these aspects are provided so that this disclosure will be thorough and complete, and will fully convey the scope of the disclosure to those skilled in the art. One skilled in the art may appreciate that the scope of the disclosure is intended to cover any aspect of the disclosure disclosed herein, whether implemented independently of or combined with any other aspect of the disclosure. For example, an apparatus may be implemented or a method may be practiced using any quantity of the aspects set forth herein. In addition, the scope of the disclosure is intended to cover such an apparatus or method which is practiced using other structure, functionality, or structure and functionality in addition to or other than the various aspects of the disclosure set forth herein. Any aspect of the disclosure disclosed herein may be embodied by one or more elements of a claim.

Several aspects of telecommunication systems will now be presented with reference to various apparatuses and techniques. These apparatuses and techniques will be described in the following detailed description and illustrated in the accompanying drawings by various blocks, modules, components, circuits, steps, processes, or algorithms (collectively referred to as "elements"). These elements may be implemented using hardware, software, or a combination of hardware and software. Whether such elements are implemented as hardware or software depends upon the particular application and design constraints imposed on the overall system.

Various aspects relate generally to communicating while in a power saving mode. Some aspects more specifically relate to a base station indicating a power saving mode to a user equipment (UE), and the base station and the UE each applying a power saving configuration, for example, based at least in part on using wake-up signals (WUSs), uplink control information (UCI), or component carriers (for example, carrier aggregation) with a configuration that is based at least in part on the power saving mode of the base station. In some aspects, the base station may transmit an indication of a set of candidate power saving modes and associated configurations, with the configurations indicating the communication parameters associated with the candidate power saving modes. In this way, an indication of the power saving mode may indicate a set of communication parameters without an explicit indication (for example, a dynamic indication) of each of the communication parameters. Similarly, an indication of a change to the power saving mode (for example, an indication of a selection of a different candidate power saving mode) may indicate a change to the set of communication parameters without an explicit indication of changes to each of the communication parameters.

In some aspects, one or more of the WUSs, UCI, or component carriers may be associated with a first configuration that is active when a first power saving mode of the base station is active and may be associated with a second configuration that is active when a second power saving mode of the base station is active. The power saving configurations may be associated with, for example, periodicities, resources used, or supported payload sizes, among other examples.

Particular aspects of the subject matter described in this disclosure can be implemented to realize one or more of the following potential advantages. In some examples, the described techniques can be used to conserve power resources based at least in part on the base station operating in a power saving mode, and to conserve network communication, power, or computing resources that may have otherwise been used to indicate values of parameters associated with the WUSs, UCI, or component carriers.

FIG. 1 is a diagram illustrating an example of a wireless network in accordance with the present disclosure. The wireless network 100 may be or may include elements of a 5G (for example, NR) network or a 4G (for example, Long Term Evolution (LTE)) network, among other examples. The wireless network 100 may include one or more base stations 110 (shown as a BS 110a, a BS 110b, a BS 110c, and a BS 110d), a UE 120 or multiple UEs 120 (shown as a UE 120a, a UE 120b, a UE 120c, a UE 120d, and a UE 120e), or other network entities. A base station 110 is an entity that communicates with UEs 120. A base station 110 (sometimes referred to as a BS) may include, for example, an NR base station, an LTE base station, a Node B, an eNB (for example, in 4G), a gNB (for example, in 5G), an access point, or a transmission reception point (TRP). Each base station 110 may provide communication coverage for a particular geographic area. In the Third Generation Partnership Project (3GPP), the term "cell" can refer to a coverage area of a base station 110 or a base station subsystem serving this coverage area, depending on the context in which the term is used.

A base station 110 may provide communication coverage for a macro cell, a pico cell, a femto cell, or another type of cell. A macro cell may cover a relatively large geographic area (for example, several kilometers in radius) and may allow unrestricted access by UEs 120 with service subscriptions. A pico cell may cover a relatively small geographic area and may allow unrestricted access by UEs 120 with service subscription. A femto cell may cover a relatively small geographic area (for example, a home) and may allow restricted access by UEs 120 having association with the femto cell (for example, UEs 120 in a closed subscriber group (CSG)). A base station 110 for a macro cell may be referred to as a macro base station. A base station 110 for a pico cell may be referred to as a pico base station. A base station 110 for a femto cell may be referred to as a femto base station or an in-home base station.

The wireless network 100 may be a heterogeneous network that includes base stations 110 of different types, such as macro base stations, pico base stations, femto base stations, or relay base stations. These different types of base stations 110 may have different transmit power levels, different coverage areas, or different impacts on interference in the wireless network 100. For example, macro base stations may have a high transmit power level (for example, 5 to 40 watts) whereas pico base stations, femto base stations, and relay base stations may have lower transmit power levels (for example, 0.1 to 2 watts). In the example shown in FIG. 1, the BS 110a may be a macro base station for a macro cell 102a, the BS 110b may be a pico base station for a pico cell 102b, and the BS 110c may be a femto base station for a femto cell 102c. A base station may support one or multiple (for example, three) cells. A network controller 130 may couple to or communicate with a set of base stations 110 and may provide coordination and control for these base stations 110. The network controller 130 may communicate with the base stations 110 via a backhaul communication link. The base stations 110 may communicate with one another directly or indirectly via a wireless or wireline backhaul communication link.

In some examples, a cell may not necessarily be stationary, and the geographic area of the cell may move in accordance with the location of a base station 110 that is mobile (for example, a mobile base station). In some examples, the base stations 110 may be interconnected to one another or to one or more other base stations 110 or network nodes (not shown) in the wireless network 100 through various types of backhaul interfaces, such as a direct physical connection or a virtual network, using any suitable transport network.

The wireless network 100 may include one or more relay stations. A relay station is an entity that can receive a transmission of data from an upstream station (for example, a base station 110 or a UE 120) and send a transmission of the data to a downstream station (for example, a UE 120 or a base station 110). A relay station may be a UE 120 that can relay transmissions for other UEs 120. In the example shown in FIG. 1, the BS 110*d* (for example, a relay base station) may communicate with the BS 110*a* (for example, a macro base station) and the UE 120*d* in order to facilitate communication between the BS 110*a* and the UE 120*d*. A base station 110 that relays communications may be referred to as a relay station, a relay base station, or a relay.

The UEs 120 may be dispersed throughout the wireless network 100, and each UE 120 may be stationary or mobile. A UE 120 may include, for example, an access terminal, a terminal, a mobile station, or a subscriber unit. A UE 120 may be a cellular phone (for example, a smart phone), a personal digital assistant (PDA), a wireless modem, a wireless communication device, a handheld device, a laptop computer, a cordless phone, a wireless local loop (WLL) station, a tablet, a camera, a gaming device, a netbook, a smartbook, an ultrabook, a medical device, a biometric device, a wearable device (for example, a smart watch, smart clothing, smart glasses, a smart wristband, smart jewelry (for example, a smart ring or a smart bracelet)), an entertainment device (for example, a music device, a video device, or a satellite radio), a vehicular component or sensor, a smart meter/sensor, industrial manufacturing equipment, a global positioning system device, or any other suitable device that is configured to communicate via a wireless medium.

Some UEs 120 may be considered machine-type communication (MTC) or evolved or enhanced machine-type communication (eMTC) UEs. An MTC UE or an eMTC UE may include, for example, a robot, a drone, a remote device, a sensor, a meter, a monitor, or a location tag, that may communicate with a base station, another device (for example, a remote device), or some other entity. Some UEs 120 may be considered Internet-of-Things (IoT) devices, or may be implemented as NB-IoT (narrowband IoT) devices. Some UEs 120 may be considered a Customer Premises Equipment. A UE 120 may be included inside a housing that houses components of the UE 120, such as processor components or memory components. In some examples, the processor components and the memory components may be coupled together. For example, the processor components (for example, one or more processors) and the memory components (for example, a memory) may be operatively coupled, communicatively coupled, electronically coupled, or electrically coupled.

In general, any quantity of wireless networks 100 may be deployed in a given geographic area. Each wireless network 100 may support a particular RAT and may operate on one or more frequencies. A RAT may be referred to as a radio technology or an air interface. A frequency may be referred to as a carrier or a frequency channel. Each frequency may support a single RAT in a given geographic area in order to avoid interference between wireless networks of different RATs. In some cases, NR or 5G RAT networks may be deployed.

In some examples, two or more UEs 120 (for example, shown as UE 120*a* and UE 120*e*) may communicate directly using one or more sidelink channels (for example, without using a base station 110 as an intermediary to communicate with one another). For example, the UEs 120 may communicate using peer-to-peer (P2P) communications, device-to-device (D2D) communications, a vehicle-to-everything (V2X) protocol (for example, which may include a vehicle-to-vehicle (V2V) protocol, a vehicle-to-infrastructure (V2I) protocol, or a vehicle-to-pedestrian (V2P) protocol), or a mesh network. In such examples, a UE 120 may perform scheduling operations, resource selection operations, or other operations described elsewhere herein as being performed by the base station 110.

Devices of the wireless network 100 may communicate using the electromagnetic spectrum, which may be subdivided by frequency or wavelength into various classes, bands, or channels. For example, devices of the wireless network 100 may communicate using one or more operating bands. In 5G NR, two initial operating bands have been identified as frequency range designations FR1 (410 MHz-7.125 GHz) and FR2 (24.25 GHz-52.6 GHz). It should be understood that although a portion of FR1 is greater than 6 GHz, FR1 is often referred to (interchangeably) as a "Sub-6 GHz" band in various documents and articles. A similar nomenclature issue sometimes occurs in connection with FR2, which is often referred to (interchangeably) as a "millimeter wave" band in documents and articles, despite being different from the extremely high frequency (EHF) band (30 GHz-300 GHz) which is identified by the International Telecommunications Union (ITU) as a "millimeter wave" band.

The frequencies between FR1 and FR2 are often referred to as mid-band frequencies. Recent 5G NR studies have identified an operating band for these mid-band frequencies as frequency range designation FR3 (7.125 GHZ-24.25 GHZ). Frequency bands falling within FR3 may inherit FR1 characteristics or FR2 characteristics, and thus may effectively extend features of FR1 or FR2 into mid-band frequencies. In addition, higher frequency bands are currently being explored to extend 5G NR operation beyond 52.6 GHz. For example, three higher operating bands have been identified as frequency range designations FR4a or FR4-1 (52.6 GHz-71 GHz), FR4 (52.6 GHz-114.25 GHZ), and FR5 (114.25 GHZ-300 GHz). Each of these higher frequency bands falls within the EHF band.

With the above examples in mind, unless specifically stated otherwise, it should be understood that the term "sub-6 GHZ," if used herein, may broadly represent frequencies that may be less than 6 GHZ, may be within FR1, or may include mid-band frequencies. Further, unless specifically stated otherwise, it should be understood that the term "millimeter wave," if used herein, may broadly represent frequencies that may include mid-band frequencies, may be within FR2, FR4, FR4-a or FR4-1, or FR5, or may be within the EHF band. It is contemplated that the frequencies included in these operating bands (for example, FR1, FR2, FR3, FR4, FR4-a, FR4-1, or FR5) may be modified, and techniques described herein are applicable to those modified frequency ranges.

In some aspects, the UE 120 may include a communication manager 140. As described in more detail elsewhere herein, the communication manager 140 may receive an indication of a power saving mode of a base station; and communicate with the base station based at least in part on the power saving mode, the communicating comprising one or more of: monitoring for a wake-up signal with a periodicity that is based at least in part on the power saving mode, transmitting UCI via control channel resources that are based at least in part on the power saving mode, or transmitting or receiving one or more communications via a set of component carriers that are based at least in part on the power saving mode. Additionally or alternatively, the communication manager 140 may perform one or more other operations described herein.

In some aspects, the base station 110 may include a communication manager 150. As described in more detail elsewhere herein, the communication manager 150 may transmit an indication of a power saving mode of the base station for communicating with a UE; and communicate with the UE based at least in part on the power saving mode, the communicating comprising one or more of: transmitting a wake-up signal via resources having a periodicity that is based at least in part on the power saving mode, receiving UCI via control channel resources that are based at least in part on the power saving mode, or transmitting or receiving one or more communications via a set of component carriers that are based at least in part on the power saving mode. Additionally or alternatively, the communication manager 150 may perform one or more other operations described herein.

Figure 2:
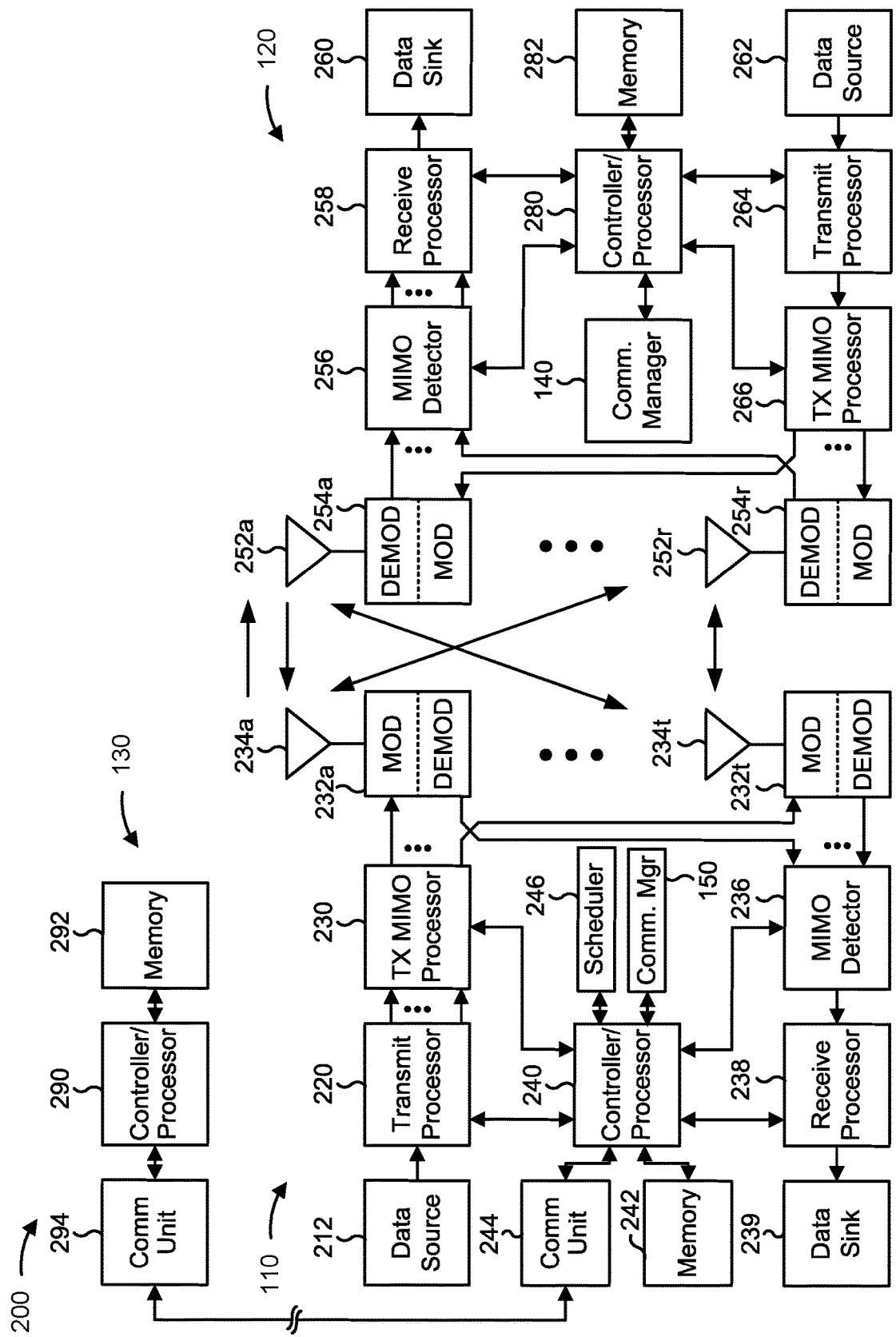
FIG. 2 is a diagram illustrating an example base station in communication with a user equipment (UE) in a wireless network in accordance with the present disclosure.

FIG. 2 is a diagram illustrating an example base station in communication with a UE in a wireless network in accordance with the present disclosure. The base station may correspond to the base station 110 of FIG. 1. Similarly, the UE may correspond to the UE 120 of FIG. 1. The base station 110 may be equipped with a set of antennas 234a through 234t, such as T antennas (T≥1). The UE 120 may be equipped with a set of antennas 252a through 252r, such as R antennas (R≥1).

At the base station 110, a transmit processor 220 may receive data, from a data source 212, intended for the UE 120 (or a set of UEs 120). The transmit processor 220 may select one or more modulation and coding schemes (MCSs) for the UE 120 based at least in part on one or more channel quality indicators (CQIs) received from that UE 120. The base station 110 may process (for example, encode and modulate) the data for the UE 120 based at least in part on the MCS(s) selected for the UE 120 and may provide data symbols for the UE 120. The transmit processor 220 may process system information (for example, for semi-static resource partitioning information (SRPI)) and control information (for example, CQI requests, grants, or upper layer signaling) and provide overhead symbols and control symbols. The transmit processor 220 may generate reference symbols for reference signals (for example, a cell-specific reference signal (CRS) or a demodulation reference signal (DMRS)) and synchronization signals (for example, a primary synchronization signal (PSS) or a secondary synchronization signal (SSS)). A transmit (TX) multiple-input multiple-output (MIMO) processor 230 may perform spatial processing (for example, precoding) on the data symbols, the control symbols, the overhead symbols, or the reference symbols, if applicable, and may provide a set of output symbol streams (for example, T output symbol streams) to a corresponding set of modems 232 (for example, T' modems), shown as modems 232a through 232t. For example, each output symbol stream may be provided to a modulator component (shown as MOD) of a modem 232. Each modem 232 may use a respective modulator component to process a respective output symbol stream (for example, for OFDM) to obtain an output sample stream. Each modem 232 may further use a respective modulator component to process (for example, convert to analog, amplify, filter, or upconvert) the output sample stream to obtain a downlink signal. The modems 232a through 232t may transmit a set of downlink signals (for example, T downlink signals) via a corresponding set of antennas 234 (for example, T antennas), shown as antennas 234a through 234t.

At the UE 120, a set of antennas 252 (shown as antennas 252a through 252r) may receive the downlink signals from the base station 110 or other base stations 110 and may provide a set of received signals (for example, R received signals) to a set of modems 254 (for example, R modems), shown as modems 254a through 254r. For example, each received signal may be provided to a demodulator component (shown as DEMOD) of a modem 254. Each modem 254 may use a respective demodulator component to condition (for example, filter, amplify, downconvert, or digitize) a received signal to obtain input samples. Each modem 254 may use a demodulator component to further process the input samples (for example, for OFDM) to obtain received symbols. A MIMO detector 256 may obtain received symbols from the modems 254, may perform MIMO detection on the received symbols if applicable, and may provide detected symbols. A receive processor 258 may process (for example, demodulate and decode) the detected symbols, may provide decoded data for the UE 120 to a data sink 260, and may provide decoded control information and system information to a controller/processor 280. The term "controller/processor" may refer to one or more controllers, one or more processors, or a combination thereof. A channel processor may determine a reference signal received power (RSRP) parameter, a received signal strength indicator (RSSI) parameter, a reference signal received quality (RSRQ) parameter, or a CQI parameter, among other examples. In some examples, one or more components of the UE 120 may be included in a housing.

The network controller 130 may include a communication unit 294, a controller/processor 290, and a memory 292. The network controller 130 may include, for example, one or more devices in a core network. The network controller 130 may communicate with the base station 110 via the communication unit 294.

One or more antennas (for example, antennas 234a through 234t or antennas 252a through 252r) may include, or may be included within, one or more antenna panels, one or more antenna groups, one or more sets of antenna elements, or one or more antenna arrays, among other examples. An antenna panel, an antenna group, a set of antenna elements, or an antenna array may include one or more antenna elements (within a single housing or multiple housings), a set of coplanar antenna elements, a set of non-coplanar antenna elements, or one or more antenna elements coupled to one or more transmission or reception components, such as one or more components of FIG. 2.

On the uplink, at the UE 120, a transmit processor 264 may receive and process data from a data source 262 and control information (for example, for reports that include RSRP, RSSI, RSRQ, or CQI) from the controller/processor 280. The transmit processor 264 may generate reference symbols for one or more reference signals. The symbols from the transmit processor 264 may be precoded by a TX MIMO processor 266 if applicable, further processed by the modems 254 (for example, for DFT-s-OFDM or CP-OFDM), and transmitted to the base station 110. In some examples, the modem 254 of the UE 120 may include a modulator and a demodulator. In some examples, the UE 120 includes a transceiver. The transceiver may include any combination of the antenna(s) 252, the modem(s) 254, the MIMO detector 256, the receive processor 258, the transmit processor 264, or the TX MIMO processor 266. The transceiver may be used by a processor (for example, the controller/processor 280) and the memory 282 to perform aspects of any of the methods described herein.

At the base station 110, the uplink signals from UE 120 or other UEs may be received by the antennas 234, processed by the modem 232 (for example, a demodulator component, shown as DEMOD, of the modem 232), detected by a MIMO detector 236 if applicable, and further processed by a receive processor 238 to obtain decoded data and control information sent by the UE 120. The receive processor 238 may provide the decoded data to a data sink 239 and provide the decoded control information to the controller/processor 240. The base station 110 may include a communication unit 244 and may communicate with the network controller 130 via the communication unit 244. The base station 110 may include a scheduler 246 to schedule one or more UEs 120 for downlink or uplink communications. In some examples, the modem 232 of the base station 110 may include a modulator and a demodulator. In some examples, the base station 110 includes a transceiver. The transceiver may include any combination of the antenna(s) 234, the modem(s) 232, the MIMO detector 236, the receive processor 238, the transmit processor 220, or the TX MIMO processor 230. The transceiver may be used by a processor (for example, the controller/processor 240) and the memory 242 to perform aspects of any of the methods described herein.

The controller/processor 240 of the base station 110, the controller/processor 280 of the UE 120, or any other component(s) of FIG. 2 may perform one or more techniques associated with communicating while in a power saving mode, as described in more detail elsewhere herein. For example, the controller/processor 240 of the base station 110, the controller/processor 280 of the UE 120, or any other component(s) of FIG. 2 may perform or direct operations of, for example, process 700 of FIG. 7, process 800 of FIG. 8, or other processes as described herein. The memory 242 and the memory 282 may store data and program codes for the base station 110 and the UE 120, respectively. In some examples, the memory 242 or the memory 282 may include a non-transitory computer-readable medium storing one or more instructions (for example, code or program code) for wireless communication. For example, the one or more instructions, when executed (for example, directly, or after compiling, converting, or interpreting) by one or more processors of the base station 110 or the UE 120, may cause the one or more processors, the UE 120, or the base station 110 to perform or direct operations of, for example, process 700 of FIG. 7, process 800 of FIG. 8, or other processes as described herein. In some examples, executing instructions may include running the instructions, converting the instructions, compiling the instructions, or interpreting the instructions, among other examples.

In some aspects, the UE includes means for receiving an indication of a power saving mode of a base station; or means for communicating with the base station based at least in part on the power saving mode, the communicating comprising one or more of: means for monitoring for a wake-up signal with a periodicity that is based at least in part on the power saving mode, means for transmitting UCI via control channel resources that are based at least in part on the power saving mode, or means for transmitting or receiving one or more communications via a set of component carriers that are based at least in part on the power saving mode. The means for the UE to perform operations described herein may include, for example, one or more of communication manager 140, antenna 252, modem 254, MIMO detector 256, receive processor 258, transmit processor 264, TX MIMO processor 266, controller/processor 280, or memory 282.

In some aspects, the base station includes means for transmitting an indication of a power saving mode of the apparatus for communicating with a UE; or means for communicating with the UE based at least in part on the power saving mode, the communicating comprising one or more of: means for transmitting a wake-up signal via resources having a periodicity that is based at least in part on the power saving mode, means for receiving UCI via control channel resources that are based at least in part on the power saving mode, or means for transmitting or receiving one or more communications via a set of component carriers that are based at least in part on the power saving mode. The means for the base station to perform operations described herein may include, for example, one or more of communication manager 150, transmit processor 220, TX MIMO processor 230, modem 232, antenna 234, MIMO detector 236, receive processor 238, controller/processor 240, memory 242, or scheduler 246.

Figure 3:
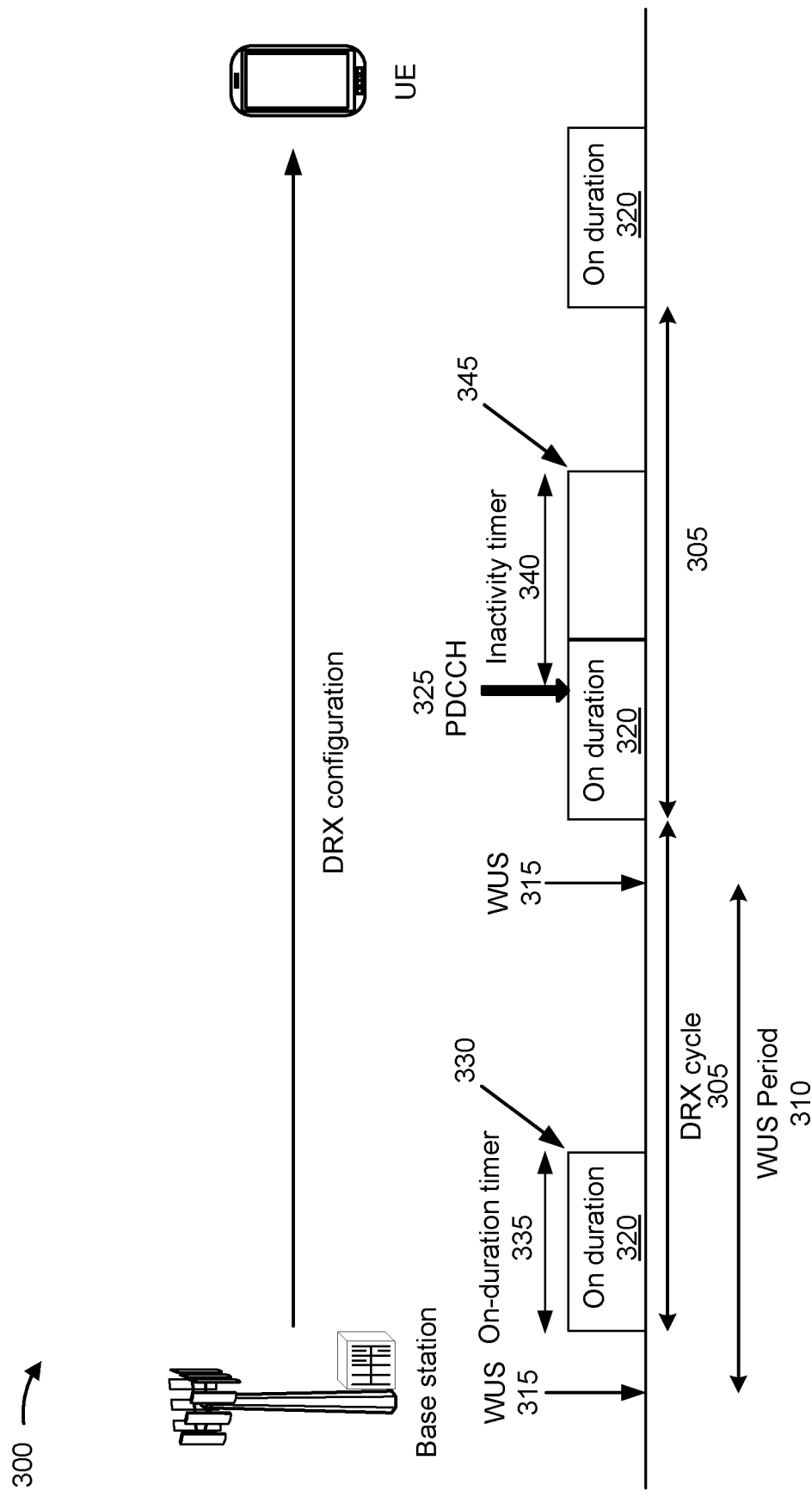
FIG. 3 is a diagram illustrating an example of a discontinuous reception (DRX) configuration, in accordance with the present disclosure.

FIG. 3 is a diagram illustrating an example 300 of a discontinuous reception (DRX) configuration, in accordance with the present disclosure.

As shown in FIG. 3, a base station 110 may transmit a DRX configuration to a UE 120 to configure a DRX cycle 305 for the UE 120. The DRX cycle 305 may be associated with a WUS period 310 that may have a same periodicity as the DRX cycle 305. The DRX configuration may indicate timing of a WUS 315 relative to a DRX on duration 320 (for example, during which a UE 120 is awake or in an active state). The WUS 315 may precede the DRX on duration 320 to indicate whether the UE is to enter into the DRX on duration 320 or skip the DRX on duration 320 (for example, to remain in an inactive state or sleep state). As used herein, time during which the UE 120 is configured to be in an active state during the DRX on duration 320 may be referred to as an active time, and the time during which the UE 120 is configured to be in the DRX sleep state may be referred to as an inactive time. As described below, the UE 120 may monitor a physical downlink control channel (PDCCH) during the active time and may refrain from monitoring the PDCCH during the inactive time.

During the DRX on duration 320 (for example, the active time), the UE 120 may monitor a downlink control channel (for example, a PDCCH), as shown by reference number 325. For example, the UE 120 may monitor the PDCCH for downlink control information (DCI) pertaining to the UE 120. If the UE 120 does not detect or successfully decode any PDCCH communications intended for the UE 120 during the DRX on duration 320 and an on-duration timer 335 expires, then the UE 120 may enter the sleep state (for example, for the inactive time) at the end of the DRX on duration 320, as shown by reference number 330. In this way, the UE 120 may conserve battery power and reduce power consumption. As shown, the DRX cycle 305 and the WUS period 310 may repeat with a configured periodicity according to the DRX configuration.

If the UE 120 detects or successfully decodes a PDCCH communication intended for the UE 120, then the UE 120 may remain in an active state (for example, awake) for the duration of a DRX inactivity timer 340 (for example, which may extend the active time). The UE 120 may start the DRX inactivity timer 340 at a time at which the PDCCH communication is received (for example, in a transmission time interval (TTI) in which the PDCCH communication is received, such as a slot or a subframe). The UE 120 may remain in the active state until the DRX inactivity timer 340 expires, at which time the UE 120 may enter the sleep state (for example, for the inactive time), as shown by reference number 345. During the duration of the DRX inactivity timer 340, the UE 120 may continue to monitor for PDCCH communications, may obtain a downlink data communication (for example, on a downlink data channel, such as a physical downlink shared channel (PDSCH)) scheduled by the PDCCH communication, or may prepare or transmit an uplink communication (for example, on a physical uplink shared channel (PUSCH)) scheduled by the PDCCH communication. The UE 120 may restart the DRX inactivity timer 340 after each detection of a PDCCH communication for the UE 120 for an initial transmission (for example, but not for a retransmission).

By operating in this manner, the UE 120 may conserve battery power and reduce power consumption by entering the sleep state. A periodicity of the WUS period or the DRX cycle 305 correlates to an amount of battery power and power consumption that is reduced based at least in part on operating in a DRX mode. Some applications of the DRX mode may be better suited for different periodicities, and the base station may configure the UE with parameters for the DRX mode. However, indicating the values for the parameters consumes communication, computing, network, or power resources of the UE or the base station. Additionally or alternatively, dynamic signaling, such as a DCI message, may have limited information fields for carrying the values for the subsequent communication parameters. In this way, the base station may be unable to realize potential power saving that the base station may otherwise support.

Figure 4:
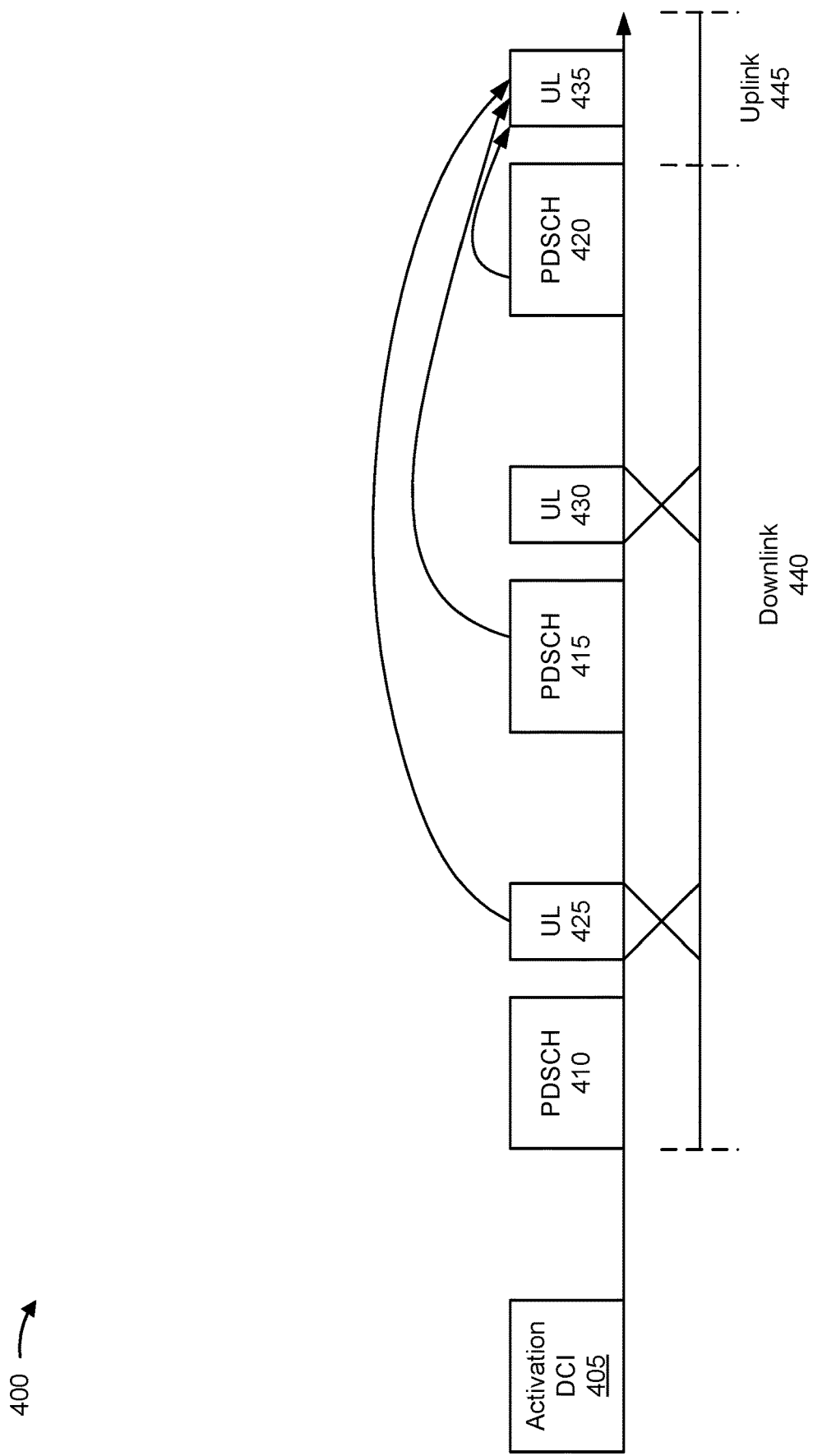
FIG. 4 is a diagram illustrating an example of communicating a hybrid automatic repeat request (HARQ) acknowledgment (HARQ-ACK) codebook for collided HARQ-ACK, in accordance with the present disclosure.

FIG. 4 is a diagram illustrating an example 400 of communicating a hybrid automatic repeat request (HARQ) acknowledgment (HARQ-ACK) codebook for collided HARQ-ACK, in accordance with the present disclosure. Communications shown in FIG. 4 may be exchanged between a UE and a base station that have an established connection.

As shown in FIG. 4, a UE may receive an activation DCI 405 that activates a periodic communication. For example, the activation DCI 405 may activate periodic PDSCH occasions 410, 415, 420. The activation DCI may also activate uplink (UL) occasions 425, 430, 435 associated with the PDSCH occasions 410, 415, 420. The UL occasions 425, 430, 435 may be configured to be active after receiving a PDSCH communication via a preceding PDSCH occasion, with the UE configured to use the UL occasion to transmit HARQ-ACK feedback associated with the PDSCH communication.

As shown in FIG. 4, the UE may be configured in a downlink communication mode 440 or in an uplink communication mode 445. Based at least in part on the UE being configured in a downlink communication mode 440 during the UL occasions 425 and 430, the UL occasions 425 and 430 may be canceled or deferred. For example, HARQ-ACK feedback associated with the UL occasions 425 and 430 may be deferred and multiplex within the UL occasion 435 as a HARQ-ACK codebook, for example. The UE may transmit a payload during the UL occasion 435, including the HARQ-ACK codebook indicating HARQ-ACK for the PDSCH occasions 410, 415, 420, during the UL occasion 435 based at least in part on the UE being configured in the uplink communication mode 445.

Based at least in part on the UE using HARQ-ACK codebooks to transmit the deferred HARQ-ACK feedback during a subsequent UL that occurs during an uplink communication mode, the UE may transmit HARQ-ACK feedback that may otherwise be missed by the base station. However, a communication configuration to support the HARQ-ACK codebook may consume computing and network resources relative to canceling the HARQ-ACK feedback that occurred during a downlink communication mode. The base station may configure the UE with parameters for supporting the HARQ-ACK codebook or not supporting the HARQ-ACK codebook. However, indicating the values for the parameters consumes communication, computing, network, or power resources of the UE or the base station. Additionally or alternatively, dynamic signaling, such as a DCI message, may have limited information fields for carrying the values for the subsequent communication parameters. In this way, the base station may be unable to realize potential power saving that the base station may otherwise support.

Figure 5:
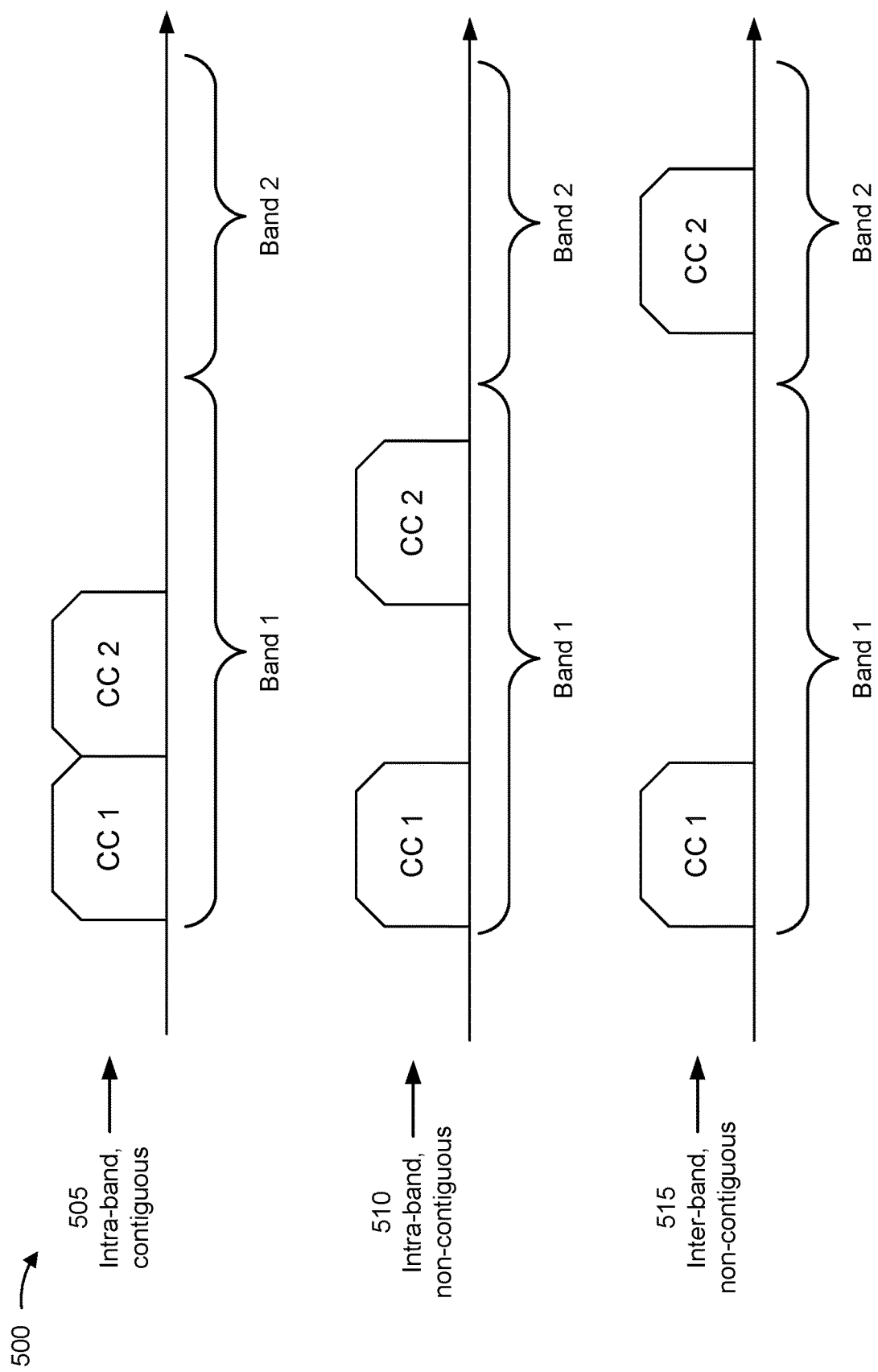
FIG. 5 is a diagram illustrating examples of carrier aggregation, in accordance with the present disclosure.

FIG. 5 is a diagram illustrating examples 500 of carrier aggregation, in accordance with the present disclosure.

Carrier aggregation is a technology that enables two or more component carriers (CCs, sometimes referred to as carriers) to be combined (for example, into a single channel) for a single UE 120 to enhance data capacity. As shown, carriers can be combined in the same or different frequency bands. Additionally or alternatively, contiguous or non-contiguous carriers can be combined. A base station 110 may configure carrier aggregation for a UE 120, such as in a radio resource control (RRC) message, DCI, or another signaling message.

As shown by reference number 505, in some aspects, carrier aggregation may be configured in an intra-band contiguous mode where the aggregated carriers are contiguous to one another and are in the same band. As shown by reference number 510, in some aspects, carrier aggregation may be configured in an intra-band non-contiguous mode where the aggregated carriers are non-contiguous to one another and are in the same band. As shown by reference number 515, in some aspects, carrier aggregation may be configured in an inter-band non-contiguous mode where the aggregated carriers are non-contiguous to one another and are in different bands.

In carrier aggregation, a UE 120 may be configured with a primary carrier or primary cell (PCell) and one or more secondary carriers or secondary cells (SCells). In some aspects, the primary carrier may carry control information (for example, DCI or scheduling information) for scheduling data communications on one or more secondary carriers, which may be referred to as cross-carrier scheduling. In some aspects, a carrier (for example, a primary carrier or a secondary carrier) may carry control information for scheduling data communications on the carrier, which may be referred to as self-carrier scheduling or carrier self-scheduling.

Carrier aggregation may improve data rates for communications between the UE and the base station. However, using multiple component carriers may consume in increased power resources relative to a single carrier communication. Additionally or alternatively, different configurations of carrier aggregation may consume different amounts of power resources. The base station may configure the UE with parameters for supporting carrier aggregation or not supporting carrier aggregation. However, indicating the values for the parameters consumes communication, computing, network, or power resources of the UE or the base station. Additionally or alternatively, dynamic signaling, such as a DCI message, may have limited information fields for carrying the values for the subsequent communication parameters. In this way, the base station may be unable to realize potential power saving that the base station may otherwise support.

Various aspects relate generally to communicating while in a power saving mode. Some aspects more specifically relate to the base station indicating a power saving mode to a UE and the base station, and the UE applying power saving configurations, for example, based at least in part on using WUSs, UCI, or component carriers (for example, carrier aggregation) with a configuration that is based at least in part on the power saving mode of the base station. In some aspects, the base station may transmit an indication of a set of candidate power saving modes and associated configurations, with the configurations indicating the communication parameters associated with the candidate power saving modes. In this way, an indication of the power saving mode may indicate a set of communication parameters without an explicit indication (for example, a dynamic indication) of each of the communication parameters. Similarly, an indication of a change to the power saving mode (for example, an indication of a selection of a different candidate power saving mode) may indicate a change to the set of communication parameters without an explicit indication of changes to each of the communication parameters.

In some aspects, one or more of the WUSs, UCI, or component carriers may be associated with a first configuration that is active when a first power saving mode of the base station is active and may be associated with a second configuration that is active when a second power saving mode of the base station is active. The power saving configurations may be associated with, for example, periodicities, resources used, or supported payload sizes, among other examples.

Particular aspects of the subject matter described in this disclosure can be implemented to realize one or more of the following potential advantages. In some examples, the described techniques can be used to conserve power resources based at least in part on the base station operating in a power saving mode, and to conserve network communication, power, or computing resources that may have otherwise been used to indicate values of parameters associated with the WUSs, UCI, or component carriers.

Figure 6:
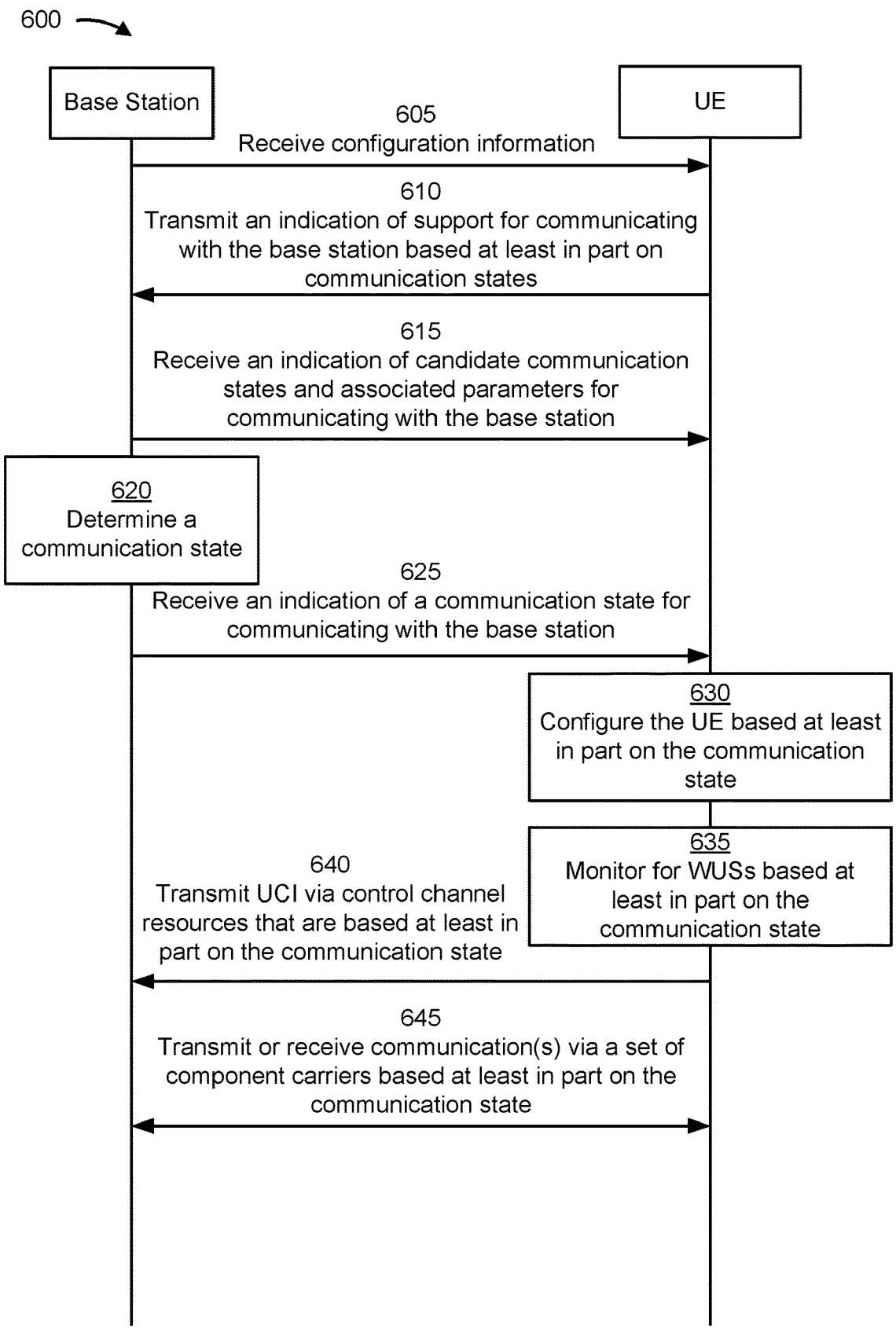
FIG. 6 is a diagram illustrating an example associated with communicating while in a power saving mode in accordance with the present disclosure.

FIG. 6 is a diagram illustrating an example 600 associated with communicating while in a power saving mode, in accordance with the present disclosure. As shown in FIG. 6, a base station (for example, base station 110) may communicate with a UE (for example, UE 120). In some aspects, the base station and the UE may be part of a wireless network (for example, wireless network 100). The UE and the base station may have established a wireless connection prior to operations shown in FIG. 6.

In a first operation 605, the base station may transmit, and the UE may receive, configuration information. In some aspects, the UE may receive the configuration information via one or more of RRC signaling, one or more medium access control (MAC) control elements (CEs), or DCI, among other examples. In some aspects, the configuration information may include an indication of one or more configuration parameters (for example, already known to the UE) for selection by the UE, or explicit configuration information for the UE to use to configure the UE, among other examples.

In some aspects, the configuration information may indicate that the UE is to transmit an indication of support for communicating with the base station based at least in part on communication states, such as a power saving mode of the base station. In some aspects, the configuration information may indicate that the base station is to transmit, and the UE is to receive, an indication of a set of candidate communication states and associated parameters for communicating with the base station. For example, the configuration information may indicate that the UE is to apply a configuration for one or more of WUSs, UCI, or component carriers based at least in part on an active power saving mode as indicated by the base station.

The UE may configure itself based at least in part on the configuration information. In some aspects, the UE may be configured to perform one or more operations described herein based at least in part on the configuration information.

In a second operation 610, the UE may transmit, and the base station may receive, an indication of support for communicating with the base station based at least in part on communication states. In some aspects, the UE may transmit the indication of support before receiving a portion of the configuration information described in connection with the first operation 605. For example, the UE may receive a first portion of the configuration information that indicates that the UE is to transmit the indication of support and may receive a second portion of the configuration information that indicates a configuration for communication with the base station based on the communication states or power saving modes of the base station.

In a third operation 615, the UE may receive, and the base station may transmit, an indication of candidate communication states and associated parameters for communicating with the base station. In some aspects, the indication of the candidate communication states, and associated parameters may indicate, a mapping of the candidate communication states to one or more parameters associated with communicating using the one or more of WUSs, UCI, or component carriers. In some aspects, the one or more communication states may be associated with one or more power saving modes of the base station. For example, each of the one or more communication states may be mapped to a power saving mode (for example, with one-to-one mapping or multiple-to-one mapping).

In some aspects, the base station may transmit, and the UE may receive, an indication to associate the candidate communication states or power saving modes with one or more parameters for communicating with the base station. For example, the UE may receive an indication to associate the one or more power saving modes with different parameters associated with a periodicity associated with monitoring for a WUS, control channel resources associated with transmitting the UCI, or the set of component carriers associated with transmitting or receiving the one or more communications, among other examples.

In some aspects, the one or more power saving modes may be associated with different WUS having periodicities that indicate different sets of WUS occasions. Additionally or alternatively, when a DRX mode is configured, a configuration of the DRX mode indicates different WUS periodicities when communicating in different power saving modes.

In some aspects, the one or more power saving modes may be associated with different parameters for transmitting UCI, such as HARQ-ACK feedback, using HARQ-ACK codebooks. Additionally or alternatively, when a periodic communication is configured or activated, a configuration of the periodic communication indicates different parameters for transmitting UCI when communicating in different power saving modes.

In some aspects, the one or more power saving modes may be associated with activation or deactivation of subsets of component carriers. Additionally or alternatively, when a component carrier is configured, a configuration of the component carrier indicates whether the component carrier is to be active or inactive when communicating in different power saving modes.

In a fourth operation 620, the base station may determine a communication state to use for communicating with the UE or additional UEs served in a cell provided by the base station. For example, the base station may determine to use a communication state associated with a power saving mode of the base station. The base station may determine to apply the power saving mode of the base station based at least in part on power constraints that limit an amount of power resources available to the base station to manage the wireless communications or a determination that power consumption can be reduced while managing current wireless communications, among other examples. In some aspects, the base station may determine the power saving mode based at least in part on a number of UEs connected with the base station, an amount of traffic handled by the base station, a type of traffic handled by the base station, channel conditions for channels between the base station and the UE, or communication channels for UEs connected with the base station, among other examples.

In a fifth operation 625, the UE may receive, and the base station may transmit, an indication of a communication state for communicating with the base station. In some aspects, the indication of the communication state may include an indication of a power saving mode of the base station. In some aspects, the indication of the communication state may indicate an active communication state from a set of candidate communication states (for example, as described in connection with the third operation 615). In some aspects, the UE may receive the indication of the power saving mode via an explicit indication or via an indication of a change of the power saving mode relative to another power saving mode of the base station (for example, an indication to reduce or increase power from the other power saving mode). For example, the indication of the communication state may include an update from an additional communication state that was previously active.

In some aspects, the UE may receive, in connection with or separately from the indication of the communication state, an indication of one or more component carrier power saving modes for one or more component carriers configured for communication between the UE and the base station. In some aspects, the UE may apply levels of power saving associated with the one or more component carrier power saving modes, such as applying power saving parameters associated with monitoring for WUS on the one or more component carriers or transmitting UCI via the one or more component carriers, among other examples.

In a sixth operation 630, the UE may configure itself based at least in part on the communication state. In some aspects, the UE may configure the UE further based at least in part on additional signaling from the base station. For example, the base station may transmit, in addition to the indication of the communication state, an indication of one or more parameters associated with communicating using the WUSs, UCI, or component carriers.

In some aspects, the UE may configure a WUS to include a sequence-based signal based at least in part on the power saving mode (for example, a low power mode). In some aspects, the WUS includes a two-stage WUS based at least in part on the power saving mode. For example, a first stage of the two-stage WUS may include the sequence-based signal and a second stage of the two-stage WUS may include DCI. In some aspects, the WUS may be configured with a repetition number or pattern that is based at least in part on the power saving mode.

In some aspects, the UE may configure control channel resources for transmitting UCI based at least in part on the power saving mode. In some aspects, the control channel resources may be associated with semi-persistent-scheduling (SPS)-based resources. For example, one or more of the SPS-based resources may be configured to serve collided HARQ-ACK feedback. In some aspects, one or more of the SPS-based resources may be deactivated based at least in part on the power saving mode. For example, where resources (for example, up to 4 common resources) are configured to serve collided HARQ-ACK, some physical uplink shared channel (PUCCH) resources may be deactivated and HARQ-ACK codebooks with a corresponding payload size may be canceled. In this way, associated deferred or canceled HARQ-ACK bits may be canceled for some power saving modes.

In some aspects, the UE may be configured to transmit or receive the one or more communications via the set of component carriers based at least in part on the set of component carriers being configured to be active component carriers while communicating during the power saving mode. In some aspects, the UE may deactivate an additional set of component carriers based at least in part on communicating during the power saving mode. In some aspects, the base station may transmit, and the UE may receive, an indication (for example, during configuration of the set of component carriers or the additional component carriers) of a mapping between activity of different component carriers and different power saving modes. Additionally or alternatively, the UE may cancel component carrier switching based at least in part on the power saving mode.

In a seventh operation 635, the UE may monitor for WUSs based at least in part on the communication state. In some aspects, the UE may monitor for the WUS using a periodicity that is based at least in part on the power saving mode. For example, a DRX occasion or a WUS periodicity may be configured for different power saving modes. In some aspects, the WUS periodicity is based at least in part on a set of WUS occasions configured for a DRX mode.

In some aspects, the WUS signal includes a sequence-based signal based at least in part on the power saving mode. In some aspects, the WUS signal is associated with DCI. In some aspects, the WUS signal includes a two-stage WUS with a first stage including the sequence-based signal and a second stage including the DCI.

In some aspects, the WUS includes an indication of a bandwidth associated with a subsequent communication with the base station. In some aspects, the WUS includes an indication of antenna switching for the subsequent communication with the base station. Additionally or alternatively, the WUS includes an indication of an update to the power saving mode for communicating with the base station (for example, to activate a different power saving mode).

In an eighth operation 640, the UE may transmit, and the base station may receive, an indication of UCI via control channel resources that are based at least in part on the communication state. In some aspects, the control channel resources are associated with SPS-based resources. In some aspects, one or more of the SPS-based resource may be deactivated based at least in part on the power saving mode. For example, the one or more SPS-based resources may be canceled to reduce a number of transmission occasion. In some aspects, the one or more SPS-based resources may be configured to serve collided HARQ-ACK feedback.

In some aspects, the one or more SPS-based resources may be canceled based at least in part on a payload of the HARQ-ACK feedback (for example, a HARQ-ACK codebook) satisfying a UCI payload threshold for the communication state or the power saving mode. For example, the UE may include transmitting a first set of UCI messages based at least in part on the first set of UCI messages having a payload that satisfies a power-saving-mode-based payload threshold. Additionally or alternatively, the UE may canceling a transmission of a second set of UCI messages based at least in part on the second set of UCI messages having a payload that fails to satisfy the power-saving-mode-based payload threshold.

In a ninth operation 645, the UE and the base station may transmit or receive one or more communications via a set of component carriers (for example, one or more component carriers) based at least in part on the communication state. In some aspects, the set of component carriers may be a subset of configured component carriers, with another subset including an additional set of component carriers that are deactivated based at least in part on the communication state or the power saving mode. In some aspects, the set of component carriers may be active, or the additional set of component carriers may be inactive, based at least in part on an indication of the association of component carriers with the set of component carriers or the additional set of component carriers. For example, the base station may indicate that set of component carriers are active when communication in the power saving mode. In some aspects, different sets of the configured component carriers may be active for different power saving modes.

In some aspects, the UE may transmit or receive the one or more communications via the set of component carriers based at least in part on applying levels of power saving to the one or more of the set of component carriers. In some aspects, the levels of power saving may be associated with the one or more component carrier power saving modes based at least in part on an indication from the base station (for example, in connection with the indication of the candidate communication states, in connection with the indication of the communication state, or in separate communication, among other examples).

In some aspects, one or more power saving parameters may be configured for communicating via the set of component carriers. For example, the base station and the UE may cancel component carrier switching based at least in part on the power saving mode. Additionally or alternatively, the base station and the UE may apply one or more power saving parameters (for example, associated with WUS monitoring or transmitting UCI, among other examples) for communicating via the set of component carriers.

Based at least in part on the UE communication with the base station using one or more configurations associated with an active power saving mode, the UE and the base station may conserve power resources based at least in part on the base station operating in a power saving mode. Additionally or alternatively, the UE and the base station may conserve network communication, power, or computing resources that may have otherwise been used to indicate values of parameters associated with the periodic reference signals.

Figure 7:
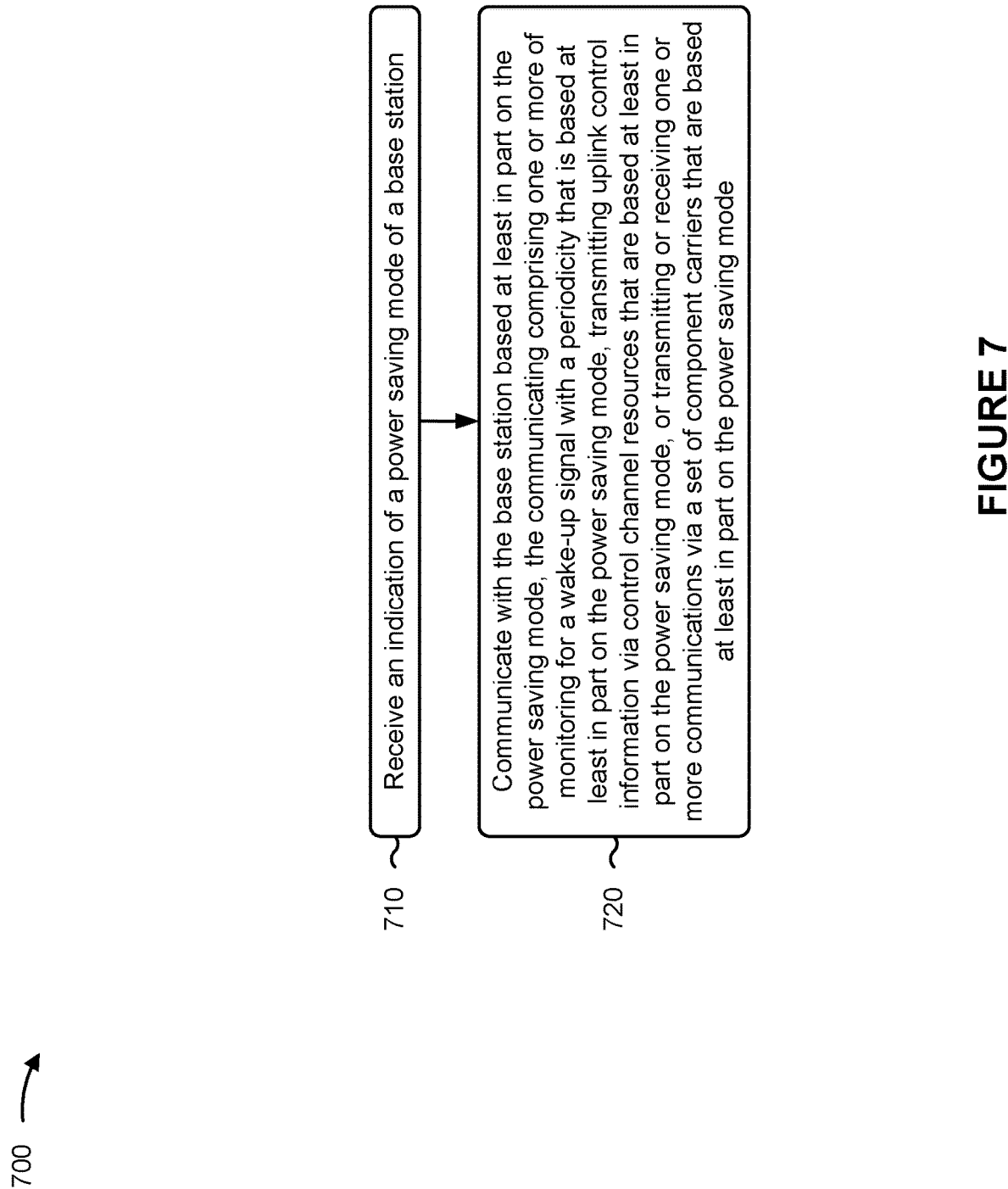
FIG. 7 is a flowchart illustrating an example process performed, for example, by a UE in accordance with the present disclosure.

FIG. 7 is a flowchart illustrating an example process 700 performed, for example, by a UE in accordance with the present disclosure. Example process 700 is an example where the UE (for example, UE 120) performs operations associated with for communicating while in power saving mode.

As shown in FIG. 7, in some aspects, process 700 may include receiving an indication of a power saving mode of a base station (block 710). For example, the UE (such as by using communication manager 140 or reception component 902, depicted in FIG. 9) may receive an indication of a power saving mode of a base station, as described above.

As further shown in FIG. 7, in some aspects, process 700 may include communicating with the base station based at least in part on the power saving mode, the communicating comprising one or more of: monitoring for a WUS with a periodicity that is based at least in part on the power saving mode, transmitting UCI via control channel resources that are based at least in part on the power saving mode, or transmitting or receiving one or more communications via a set of component carriers that are based at least in part on the power saving mode (block 720). For example, the UE (such as by using communication manager 140, reception component 902, or transmission component 904, depicted in FIG. 9) may communicate with the base station based at least in part on the power saving mode, as described above. In some aspects, the communicating may include one or more of: monitoring for a WUS with a periodicity that is based at least in part on the power saving mode, transmitting UCI via control channel resources that are based at least in part on the power saving mode, or transmitting or receiving one or more communications via a set of component carriers that are based at least in part on the power saving mode.

Process 700 may include additional aspects, such as any single aspect or any combination of aspects described below or in connection with one or more other processes described elsewhere herein.

In a first additional aspect, the periodicity associated with monitoring the WUS is based at least in part on the power saving mode being associated with a power saving mode of the base station.

In a second additional aspect, alone or in combination with the first aspect, the power saving mode is associated with a set of WUS occasions, and wherein the WUS has the periodicity based at least in part on the set of WUS occasions.

In a third additional aspect, alone or in combination with one or more of the first and second aspects, the WUS is associated with DCI, and wherein the WUS comprises a sequence-based signal based at least in part on the power saving mode.

In a fourth additional aspect, alone or in combination with one or more of the first through third aspects, the WUS comprises a two-stage WUS, wherein a first stage of the two-stage WUS comprises the sequence-based signal, and wherein a second stage of the two-stage WUS comprises the DCI.

In a fifth additional aspect, alone or in combination with one or more of the first through fourth aspects, a configuration of repetitions associated with the WUS is based at least in part on the power saving mode.

In a sixth additional aspect, alone or in combination with one or more of the first through fifth aspects, the WUS comprises one or more of an indication of a bandwidth associated with a subsequent communication with the base station, an indication of antenna switching for the subsequent communication with the base station, or an indication of an update to the power saving mode for communicating with the base station.

In a seventh additional aspect, alone or in combination with one or more of the first through sixth aspects, the control channel resources are associated with SPS-based resources, and wherein one or more of the SPS-based resources are deactivated based at least in part on the power saving mode.

In an eighth additional aspect, alone or in combination with one or more of the first through seventh aspects, the one or more SPS-based resources are configured to serve collided HARQ-ACK feedback.

In a ninth additional aspect, alone or in combination with one or more of the first through eighth aspects, transmitting the UCI via control channel resources that are based at least in part on the power saving mode comprises one or more of: transmitting a first set of UCI messages based at least in part on the first set of UCI messages having a payload that satisfies a power-saving-mode-based payload threshold, or canceling a transmission of a second set of UCI messages based at least in part on the second set of UCI messages having a payload that fails to satisfy the power saving-mode-based payload threshold.

In a tenth additional aspect, alone or in combination with one or more of the first through ninth aspects, transmitting or receiving the one or more communications via the set of component carriers comprises deactivating an additional set of component carriers.

In an eleventh additional aspect, alone or in combination with one or more of the first through tenth aspects, process 700 includes receiving an indication of associations of component carriers with the set of component carriers or the additional set of component carriers.

In a twelfth additional aspect, alone or in combination with one or more of the first through eleventh aspects, process 700 includes receiving an indication of one or more component carrier power saving modes for one or more of the set of component carriers, wherein transmitting or receiving the one or more communications via the set of component carriers comprises applying levels of power saving, associated with the one or more component carrier power saving modes, to the one or more of the set of component carriers.

In a thirteenth additional aspect, alone or in combination with one or more of the first through twelfth aspects, transmitting or receiving the one or more communications via the set of component carriers comprises canceling component carrier switching based at least in part on the power saving mode.

In a fourteenth additional aspect, alone or in combination with one or more of the first through thirteenth aspects, process 700 includes receiving an indication to associate, with the power saving mode of the base station, one or more of the periodicity associated with monitoring for the WUS, the control channel resources associated with transmitting the UCI, or the set of component carriers associated with transmitting or receiving the one or more communications.

In a fifteenth additional aspect, alone or in combination with one or more of the first through fourteenth aspects, process 700 includes transmitting an indication to associate, with the power saving mode of the base station, one or more of the periodicity associated with monitoring for the WUS, the control channel resources associated with transmitting the UCI, or the set of component carriers associated with transmitting or receiving the one or more communications.

Although FIG. 7 shows example blocks of process 700, in some aspects, process 700 may include additional blocks, fewer blocks, different blocks, or differently arranged blocks than those depicted in FIG. 7. Additionally or alternatively, two or more of the blocks of process 700 may be performed in parallel.

Figure 8:
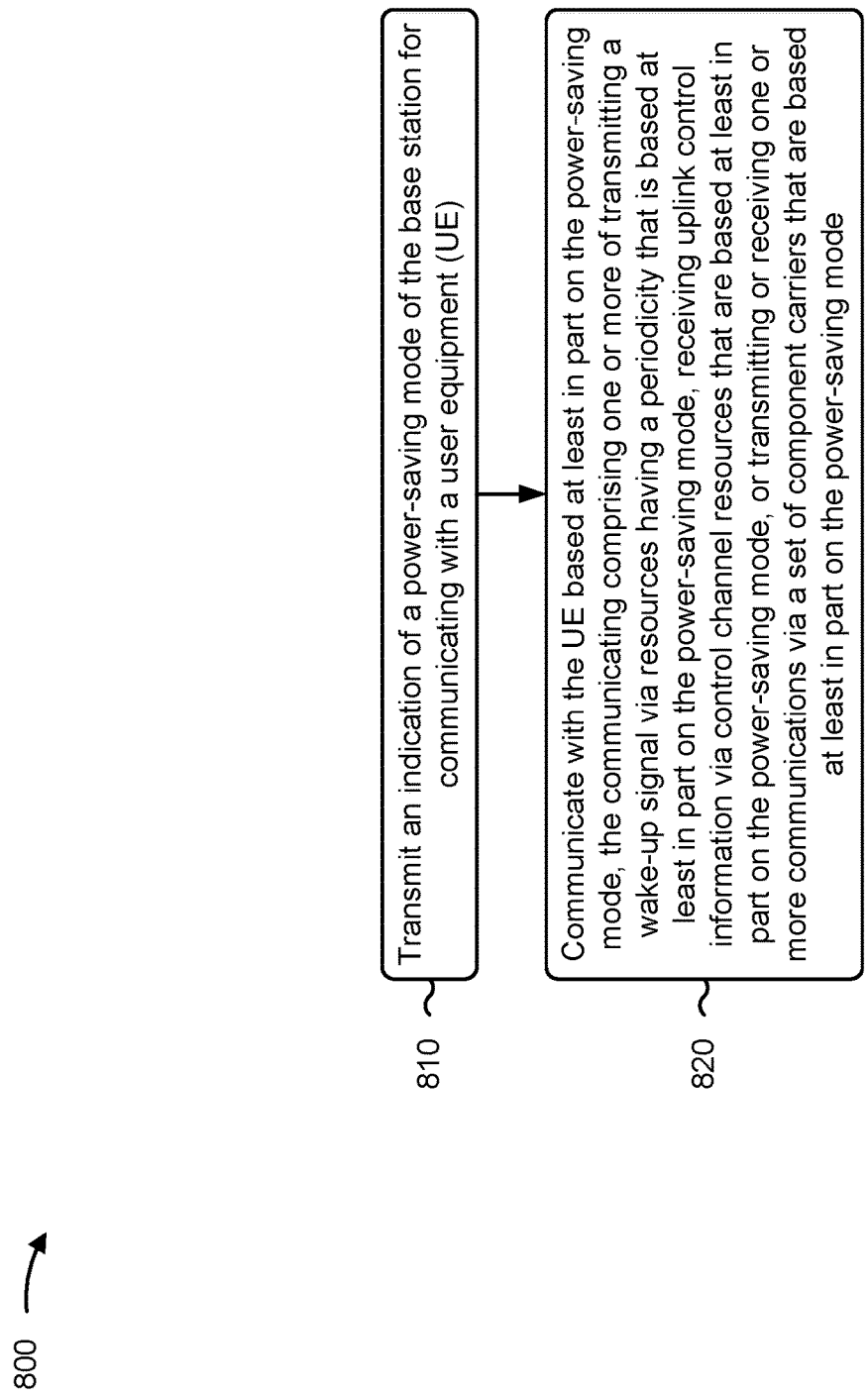
FIG. 8 is a flowchart illustrating an example process performed, for example, by a base station in accordance with the present disclosure.

FIG. 8 is a flowchart illustrating an example process 800 performed, for example, by a base station in accordance with the present disclosure. Example process 800 is an example where the base station (for example, base station 110) performs operations associated with communicating while in power saving mode.

As shown in FIG. 8, in some aspects, process 800 may include transmitting an indication of a power saving mode of the base station for communicating with a UE (block 810). For example, the base station (such as by using communication manager 150 or transmission component 1004, depicted in FIG. 10) may transmit an indication of a power saving mode of the base station for communicating with a UE, as described above.

As further shown in FIG. 8, in some aspects, process 800 may include communicating with the UE based at least in part on the power saving mode, the communicating comprising one or more of: transmitting a WUS via resources having a periodicity that is based at least in part on the power saving mode, receiving UCI via control channel resources that are based at least in part on the power saving mode, or transmitting or receiving one or more communications via a set of component carriers that are based at least in part on the power saving mode (block 820). For example, the base station (such as by using communication manager 150, reception component 1002, or transmission component 1004, depicted in FIG. 10) may communicate with the UE based at least in part on the power saving mode, the communicating comprising one or more of: transmitting a WUS via resources having a periodicity that is based at least in part on the power saving mode, receiving UCI via control channel resources that are based at least in part on the power saving mode, or transmitting or receiving one or more communications via a set of component carriers that are based at least in part on the power saving mode, as described above.

Process 800 may include additional aspects, such as any single aspect or any combination of aspects described below or in connection with one or more other processes described elsewhere herein.

In a first additional aspect, the power saving mode is associated with a set of WUS occasions, and wherein the WUS has the periodicity based at least in part on the set of WUS occasions.

In a second additional aspect, alone or in combination with the first aspect, the WUS is associated with DCI, and wherein the WUS comprises a sequence-based signal based at least in part on the power saving mode.

In a third additional aspect, alone or in combination with one or more of the first and second aspects, the WUS comprises a two-stage WUS, wherein a first stage of the two-stage WUS comprises the sequence-based signal, and wherein a second stage of the two-stage WUS comprises the DCI.

In a fourth additional aspect, alone or in combination with one or more of the first through third aspects, a configuration of repetitions associated with the WUS is based at least in part on the power saving mode.

In a fifth additional aspect, alone or in combination with one or more of the first through fourth aspects, the WUS comprises one or more of an indication of a bandwidth associated with a subsequent communication with the base station, an indication of antenna switching for the subsequent communication with the base station, or an indication of an update to the power saving mode for communicating with the base station.

In a sixth additional aspect, alone or in combination with one or more of the first through fifth aspects, the control channel resources are associated with SPS-based resources, and wherein one or more of the SPS-based resources are deactivated based at least in part on the power saving mode.

In a seventh additional aspect, alone or in combination with one or more of the first through sixth aspects, the one or more SPS-based resources are configured to serve collided HARQ-ACK feedback.

In an eighth additional aspect, alone or in combination with one or more of the first through seventh aspects, receiving the UCI via control channel resources that are based at least in part on the power saving mode comprises one or more of receiving a first set of UCI messages based at least in part on the first set of UCI messages having a payload that satisfies a power-saving-mode-based payload threshold, or failing to receive a transmission of a second set of UCI messages based at least in part on the second set of UCI messages having a payload that fails to satisfy the power-saving-mode-based payload threshold.

In a ninth additional aspect, alone or in combination with one or more of the first through eighth aspects, transmitting or receiving the one or more communications via the set of component carriers comprises deactivating an additional set of component carriers.

In a tenth additional aspect, alone or in combination with one or more of the first through ninth aspects, process 800 includes transmitting an indication of associations of component carriers with the set of component carriers or the additional set of component carriers.

In an eleventh additional aspect, alone or in combination with one or more of the first through tenth aspects, process 800 includes transmitting an indication of one or more component carrier power saving modes for one or more of the set of component carriers, wherein transmitting or receiving the one or more communications via the set of component carriers comprises applying a level of power saving, associated with the one or more component carrier power saving modes, to the one or more of the set of component carriers.

In a twelfth additional aspect, alone or in combination with one or more of the first through eleventh aspects, transmitting or receiving the one or more communications via the set of component carriers comprises canceling component carrier switching based at least in part on the power saving mode.

Although FIG. 8 shows example blocks of process 800, in some aspects, process 800 may include additional blocks, fewer blocks, different blocks, or differently arranged blocks than those depicted in FIG. 8. Additionally or alternatively, two or more of the blocks of process 800 may be performed in parallel.

Figure 9:
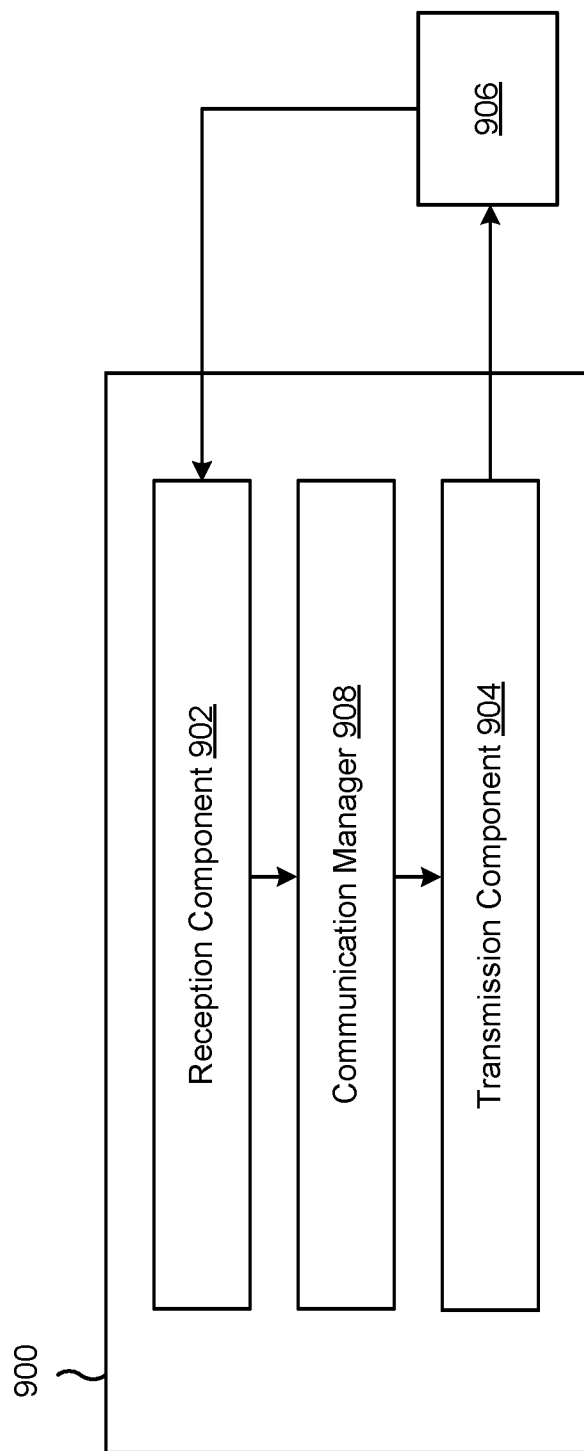
FIGS. 9 and 10 are diagrams of example apparatuses for wireless communication in accordance with the present disclosure.

FIG. 9 is a diagram of an example apparatus 900 for wireless communication. The apparatus 900 may be a UE, or a UE may include the apparatus 900. In some aspects, the apparatus 900 includes a reception component 902 and a transmission component 904, which may be in communication with one another (for example, via one or more buses or one or more other components). As shown, the apparatus 900 may communicate with another apparatus 906 (such as a UE, a base station, or another wireless communication device) using the reception component 902 and the transmission component 904. As further shown, the apparatus 900 may include a communication manager 908 (for example, the communication manager 140). The communication manager 908 may provide information to, or receive information from, the reception component 902 and the transmission component 904 in connection with one or more of reception or transmission operations described herein.

In some aspects, the apparatus 900 may be configured to perform one or more operations described herein in connection with FIG. 6. Additionally or alternatively, the apparatus 900 may be configured to perform one or more processes described herein, such as process 700 of FIG. 7. In some aspects, the apparatus 900 or one or more components shown in FIG. 9 may include one or more components of the UE described in connection with FIG. 2. Additionally or alternatively, one or more components shown in FIG. 9 may be implemented within one or more components described in connection with FIG. 2. Additionally or alternatively, one or more components of the set of components may be implemented at least in part as software stored in a memory. For example, a component (or a portion of a component) may be implemented as instructions or code stored in a non-transitory computer-readable medium and executable by a controller or a processor to perform the functions or operations of the component.

The reception component 902 may receive communications, such as reference signals, control information, data communications, or a combination thereof, from the apparatus 906. The reception component 902 may provide received communications to one or more other components of the apparatus 900. In some aspects, the reception component 902 may perform signal processing on the received communications (such as filtering, amplification, demodulation, analog-to-digital conversion, demultiplexing, deinterleaving, de-mapping, equalization, interference cancelation, or decoding, among other examples), and may provide the processed signals to the one or more other components of the apparatus 900. In some aspects, the reception component 902 may include one or more antennas, a modem, a demodulator, a MIMO detector, a receive processor, a controller/processor, a memory, or a combination thereof, of the UE described in connection with FIG. 2.

The transmission component 904 may transmit communications, such as reference signals, control information, data communications, or a combination thereof, to the apparatus 906. In some aspects, one or more other components of the apparatus 900 may generate communications and may provide the generated communications to the transmission component 904 for transmission to the apparatus 906. In some aspects, the transmission component 904 may perform signal processing on the generated communications (such as filtering, amplification, modulation, digital-to-analog conversion, multiplexing, interleaving, mapping, or encoding, among other examples), and may transmit the processed signals to the apparatus 906. In some aspects, the transmission component 904 may include one or more antennas, a modem, a modulator, a transmit MIMO processor, a transmit processor, a controller/processor, a memory, or a combination thereof, of the UE described in connection with FIG. 2. In some aspects, the transmission component 904 may be co-located with the reception component 902 in a transceiver.

The reception component 902 may receive an indication of a power saving mode of a base station. The reception component 902 or the transmission component 904 may communicate with the base station based at least in part on the power saving mode, the communicating comprising one or more of monitoring for a WUS with a periodicity that is based at least in part on the power saving mode, transmitting UCI via control channel resources that are based at least in part on the power saving mode, or transmitting or receiving one or more communications via a set of component carriers that are based at least in part on the power saving mode.

The reception component 902 may receive an indication of associations of component carriers with the set of component carriers or the additional set of component carriers.

The reception component 902 may receive an indication of one or more component carrier power saving modes for one or more of the set of component carriers wherein transmitting or receiving the one or more communications via the set of component carriers comprises applying levels of power saving, associated with the one or more component carrier power saving modes, to the one or more of the set of component carriers.

The reception component 902 may receive an indication to associate, with the power saving mode of the base station, one or more of the periodicity associated with monitoring for the WUS, the control channel resources associated with transmitting the UCI, or the set of component carriers associated with transmitting or receiving the one or more communications.

The number and arrangement of components shown in FIG. 9 are provided as an example. In practice, there may be additional components, fewer components, different components, or differently arranged components than those shown in FIG. 9. Furthermore, two or more components shown in FIG. 9 may be implemented within a single component, or a single component shown in FIG. 9 may be implemented as multiple, distributed components. Additionally or alternatively, a set of (one or more) components shown in FIG. 9 may perform one or more functions described as being performed by another set of components shown in FIG. 9.

Figure 10:
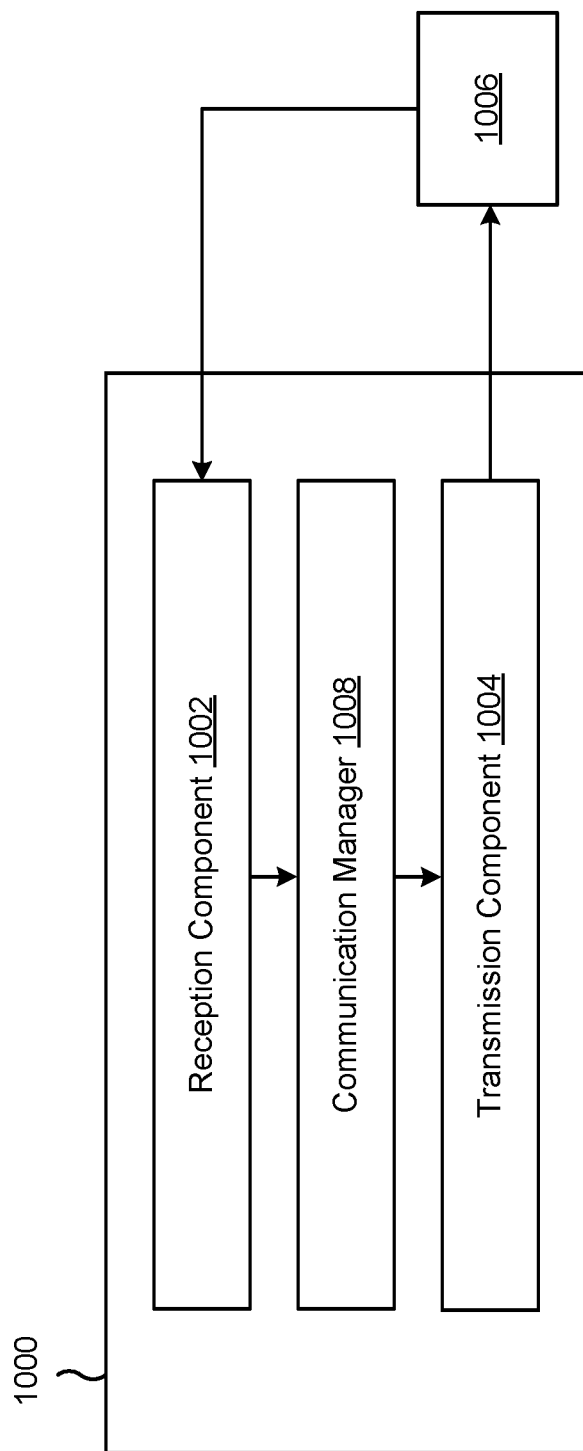

FIG. 10 is a diagram of an example apparatus 1000 for wireless communication. The apparatus 1000 may be a base station, or a base station may include the apparatus 1000. In some aspects, the apparatus 1000 includes a reception component 1002 and a transmission component 1004, which may be in communication with one another (for example, via one or more buses or one or more other components). As shown, the apparatus 1000 may communicate with another apparatus 1006 (such as a UE, a base station, or another wireless communication device) using the reception component 1002 and the transmission component 1004. As further shown, the apparatus 1000 may include a communication manager 1008 (for example, the communication manager 150). The communication manager 1008 may provide information to, or receive information from, the reception component 1002 and the transmission component 1004 in connection with one or more of reception or transmission operations described herein.

In some aspects, the apparatus 1000 may be configured to perform one or more operations described herein in connection with FIG. 6. Additionally or alternatively, the apparatus 1000 may be configured to perform one or more processes described herein, such as process 800 of FIG. 8. In some aspects, the apparatus 1000 or one or more components shown in FIG. 10 may include one or more components of the base station described in connection with FIG. 2. Additionally or alternatively, one or more components shown in FIG. 10 may be implemented within one or more components described in connection with FIG. 2. Additionally or alternatively, one or more components of the set of components may be implemented at least in part as software stored in a memory. For example, a component (or a portion of a component) may be implemented as instructions or code stored in a non-transitory computer-readable medium and executable by a controller or a processor to perform the functions or operations of the component.

The reception component 1002 may receive communications, such as reference signals, control information, data communications, or a combination thereof, from the apparatus 1006. The reception component 1002 may provide received communications to one or more other components of the apparatus 1000. In some aspects, the reception component 1002 may perform signal processing on the received communications (such as filtering, amplification, demodulation, analog-to-digital conversion, demultiplexing, deinterleaving, de-mapping, equalization, interference cancelation, or decoding, among other examples), and may provide the processed signals to the one or more other components of the apparatus 1000. In some aspects, the reception component 1002 may include one or more antennas, a modem, a demodulator, a MIMO detector, a receive processor, a controller/processor, a memory, or a combination thereof, of the base station described in connection with FIG. 2.

The transmission component 1004 may transmit communications, such as reference signals, control information, data communications, or a combination thereof, to the apparatus 1006. In some aspects, one or more other components of the apparatus 1000 may generate communications and may provide the generated communications to the transmission component 1004 for transmission to the apparatus 1006. In some aspects, the transmission component 1004 may perform signal processing on the generated communications (such as filtering, amplification, modulation, digital-to-analog conversion, multiplexing, interleaving, mapping, or encoding, among other examples), and may transmit the processed signals to the apparatus 1006. In some aspects, the transmission component 1004 may include one or more antennas, a modem, a modulator, a transmit MIMO processor, a transmit processor, a controller/processor, a memory, or a combination thereof, of the base station described in connection with FIG. 2. In some aspects, the transmission component 1004 may be co-located with the reception component 1002 in a transceiver.

The transmission component 1004 may transmit an indication of a power saving mode of the base station for communicating with a UE. The reception component 1002 or the transmission component 1004 may communicate with the UE based at least in part on the power saving mode, the communicating comprising one or more of transmitting a WUS via resources having a periodicity that is based at least in part on the power saving mode, receiving UCI via control channel resources that are based at least in part on the power saving mode, or transmitting or receiving one or more communications via a set of component carriers that are based at least in part on the power saving mode.

The transmission component 1004 may transmit an indication of associations of component carriers with the set of component carriers or the additional set of component carriers.

The transmission component 1004 may transmit an indication of one or more component carrier power saving modes for one or more of the set of component carriers wherein transmitting or receiving the one or more communications via the set of component carriers comprises applying a level of power saving, associated with the one or more component carrier power saving modes, to the one or more of the set of component carriers.

The transmission component 1004 may transmit an indication to associate, with the power saving mode of the base station, one or more of the periodicity associated with monitoring for the WUS, the control channel resources associated with transmitting the UCI, or the set of component carriers associated with transmitting or receiving the one or more communications.

The number and arrangement of components shown in FIG. 10 are provided as an example. In practice, there may be additional components, fewer components, different components, or differently arranged components than those shown in FIG. 10. Furthermore, two or more components shown in FIG. 10 may be implemented within a single component, or a single component shown in FIG. 10 may be implemented as multiple, distributed components. Additionally or alternatively, a set of (one or more) components shown in FIG. 10 may perform one or more functions described as being performed by another set of components shown in FIG. 10.

The following provides an overview of some Aspects of the present disclosure:

Aspect 1: A method of wireless communication performed by a user equipment (UE), comprising: receiving an indication of a power saving mode of a base station; and communicating with the base station based at least in part on the power saving mode, the communicating comprising one or more of: monitoring for a wake-up signal with a periodicity that is based at least in part on the power saving mode, transmitting uplink control information via control channel resources that are based at least in part on the power saving mode, or transmitting or receiving one or more communications via a set of component carriers that are based at least in part on the power saving mode.

Aspect 2: The method of Aspect 1, wherein the periodicity associated with monitoring the wake-up signal is based at least in part on the power saving mode being associated with a power saving mode of the base station.

Aspect 3: The method of any of Aspects 1 or 2, wherein the power saving mode is associated with a set of wake-up signal occasions, and wherein the wake-up signal has the periodicity based at least in part on the set of wake-up signal occasions.

Aspect 4: The method of any of Aspects 1-3, wherein the wake-up signal is associated with downlink control information, and wherein the wake-up signal comprises a sequence-based signal based at least in part on the power saving mode.

Aspect 5: The method of Aspect 4, wherein the wake-up signal comprises a two-stage wake-up signal, wherein a first stage of the two-stage wake-up signal comprises the sequence-based signal, and wherein a second stage of the two-stage wake-up signal comprises the downlink control information.

Aspect 6: The method of any of Aspects 1-5, wherein a configuration of repetitions associated with the wake-up signal is based at least in part on the power saving mode.

Aspect 7: The method of any of Aspects 1-6, wherein the wake-up signal comprises one or more of: an indication of a bandwidth associated with a subsequent communication with the base station, an indication of antenna switching for the subsequent communication with the base station, or an indication of an update to the power saving mode for communicating with the base station.

Aspect 8: The method of any of Aspects 1-7, wherein the control channel resources are associated with semi-persistent-scheduling (SPS)-based resources, and wherein one or more of the SPS-based resources are deactivated based at least in part on the power saving mode.

Aspect 9: The method of Aspect 8, wherein the one or more of the SPS-based resources are configured to serve collided hybrid automatic repeat request (HARQ) acknowledgment (HARQ-ACK) feedback.

Aspect 10: The method of any of Aspects 1-9, wherein transmitting the uplink control information via control channel resources that are based at least in part on the power saving mode comprises one or more of: transmitting a first set of uplink control information messages based at least in part on the first set of uplink control information messages having a payload that satisfies a power-saving-mode-based payload threshold, or canceling a transmission of a second set of uplink control information messages based at least in part on the second set of uplink control information messages having a payload that fails to satisfy the power saving-mode-based payload threshold.

Aspect 11: The method of any of Aspects 1-10, wherein transmitting or receiving the one or more communications via the set of component carriers comprises: deactivating an additional set of component carriers.

Aspect 12: The method of Aspect 11, further comprising: receiving an indication of associations of component carriers with the set of component carriers or the additional set of component carriers.

Aspect 13: The method of any of Aspects 1-12, further comprising: receiving an indication of one or more component carrier power saving modes for one or more of the set of component carriers, wherein transmitting or receiving the one or more communications via the set of component carriers comprises applying levels of power saving, associated with the one or more component carrier power saving modes, to the one or more of the set of component carriers.

Aspect 14: The method of any of Aspects 1-13, wherein transmitting or receiving the one or more communications via the set of component carriers comprises: canceling component carrier switching based at least in part on the power saving mode.

Aspect 15: The method of any of Aspects 1-14, further comprising: receiving an indication to associate, with the power saving mode of the base station, one or more of: the periodicity associated with monitoring for the wake-up signal, the control channel resources associated with transmitting the uplink control information, or the set of component carriers associated with transmitting or receiving the one or more communications.

Aspect 16: A method of wireless communication performed by a base station, comprising: transmitting an indication of a power saving mode of the base station for communicating with a user equipment (UE); and communicating with the UE based at least in part on the power saving mode, the communicating comprising one or more of: transmitting a wake-up signal via resources having a periodicity that is based at least in part on the power saving mode, receiving uplink control information via control channel resources that are based at least in part on the power saving mode, or transmitting or receiving one or more communications via a set of component carriers that are based at least in part on the power saving mode.

Aspect 17: The method of Aspect 16, wherein the power saving mode is associated with a set of wake-up signal occasions, and wherein the wake-up signal has the periodicity based at least in part on the set of wake-up signal occasions.

Aspect 18: The method of any of Aspects 16 or 17, wherein the wake-up signal is associated with downlink control information, and wherein the wake-up signal comprises a sequence-based signal based at least in part on the power saving mode.

Aspect 19: The method of Aspect 18, wherein the wake-up signal comprises a two-stage wake-up signal, wherein a first stage of the two-stage wake-up signal comprises the sequence-based signal, and wherein a second stage of the two-stage wake-up signal comprises the downlink control information.

Aspect 20: The method of any of Aspects 16-19, wherein a configuration of repetitions associated with the wake-up signal is based at least in part on the power saving mode.

Aspect 21: The method of any of Aspects 16-20, wherein the wake-up signal comprises one or more of: an indication of a bandwidth associated with a subsequent communication with the base station, an indication of antenna switching for the subsequent communication with the base station, or an indication of an update to the power saving mode for communicating with the base station.

Aspect 22: The method of any of Aspects 16-21, wherein the control channel resources are associated with semi-persistent-scheduling (SPS)-based resources, and wherein one or more of the SPS-based resources are deactivated based at least in part on the power saving mode.

Aspect 23: The method of Aspect 22, wherein the one or more of the SPS-based resources are configured to serve collided hybrid automatic repeat request (HARQ) acknowledgment (HARQ-ACK) feedback.

Aspect 24: The method of any of Aspects 16-23, wherein receiving the uplink control information via control channel resources that are based at least in part on the power saving mode comprises one or more of: receiving a first set of uplink control information messages based at least in part on the first set of uplink control information messages having a payload that satisfies a power-saving-mode-based payload threshold, or failing to receive a transmission of a second set of uplink control information messages based at least in part on the second set of uplink control information messages having a payload that fails to satisfy the power-saving-mode-based payload threshold.

Aspect 25: The method of any of Aspects 16-24, wherein transmitting or receiving the one or more communications via the set of component carriers comprises: deactivating an additional set of component carriers.

Aspect 26: The method of Aspect 25, further comprising: transmitting an indication of associations of component carriers with the set of component carriers or the additional set of component carriers.

Aspect 27: The method of any of Aspects 16-26, further comprising: transmitting an indication of one or more component carrier power saving modes for one or more of the set of component carriers, wherein transmitting or receiving the one or more communications via the set of component carriers comprises applying a level of power saving, associated with the one or more component carrier power saving modes, to the one or more of the set of component carriers.

Aspect 28: The method of any of Aspects 16-27, wherein transmitting or receiving the one or more communications via the set of component carriers comprises: canceling component carrier switching based at least in part on the power saving mode.

Aspect 29: The method of any of Aspects 16-28, further comprising: transmitting an indication to associate, with the power saving mode of the base station, one or more of: the periodicity associated with monitoring for the wake-up signal, the control channel resources associated with transmitting the uplink control information, or the set of component carriers associated with transmitting or receiving the one or more communications.

Aspect 30: An apparatus for wireless communication at a device, comprising a processor; memory coupled with the processor; and instructions stored in the memory and executable by the processor to cause the apparatus to perform the method of one or more of Aspects 1-29.

Aspect 31: A device for wireless communication, comprising a memory and one or more processors coupled to the memory, the one or more processors configured to perform the method of one or more of Aspects 1-29.

Aspect 32: An apparatus for wireless communication, comprising at least one means for performing the method of one or more of Aspects 1-29.

Aspect 33: A non-transitory computer-readable medium storing code for wireless communication, the code comprising instructions executable by a processor to perform the method of one or more of Aspects 1-29.

Aspect 34: A non-transitory computer-readable medium storing a set of instructions for wireless communication, the set of instructions comprising one or more instructions that, when executed by one or more processors of a device, cause the device to perform the method of one or more of Aspects 1-29.

The foregoing disclosure provides illustration and description but is not intended to be exhaustive or to limit the aspects to the precise forms disclosed. Modifications and variations may be made in light of the above disclosure or may be acquired from practice of the aspects.

As used herein, the term "component" is intended to be broadly construed as hardware or a combination of hardware and software. "Software" shall be construed broadly to mean instructions, instruction sets, code, code segments, program code, programs, subprograms, software modules, applications, software applications, software packages, routines, subroutines, objects, executables, threads of execution, procedures, or functions, among other examples, whether referred to as software, firmware, middleware, microcode, hardware description language, or otherwise. As used herein, a "processor" is implemented in hardware or a combination of hardware and software. It will be apparent that systems or methods described herein may be implemented in different forms of hardware or a combination of hardware and software. The actual specialized control hardware or software code used to implement these systems or methods is not limiting of the aspects. Thus, the operation and behavior of the systems or methods are described herein without reference to specific software code, since those skilled in the art will understand that software and hardware can be designed to implement the systems or methods based, at least in part, on the description herein.

As used herein, "satisfying a threshold" may, depending on the context, refer to a value being greater than the threshold, greater than or equal to the threshold, less than the threshold, less than or equal to the threshold, equal to the threshold, or not equal to the threshold, among other examples.

Even though particular combinations of features are recited in the claims or disclosed in the specification, these combinations are not intended to limit the disclosure of various aspects. Many of these features may be combined in ways not specifically recited in the claims or disclosed in the specification. The disclosure of various aspects includes each dependent claim in combination with every other claim in the claim set. As used herein, a phrase referring to "at least one of" a list of items refers to any combination of those items, including single members. As an example, "at least one of: a, b, or c" is intended to cover a, b, c, a+b, a+c, b+c, and a+b+c, as well as any combination with multiples of the same element (for example, a+a, a+a+a, a+a+b, a+a+c, a+b+b, a+c+c, b+b, b+b+b, b+b+c, c+c, and c+c+c, or any other ordering of a, b, and c).

No element, act, or instruction used herein should be construed as critical or essential unless explicitly described as such. Also, as used herein, the articles "a" and "an" are intended to include one or more items and may be used interchangeably with "one or more." Further, as used herein, the article "the" is intended to include one or more items referenced in connection with the article "the" and may be used interchangeably with "the one or more." Furthermore, as used herein, the terms "set" and "group" are intended to include one or more items and may be used interchangeably with "one or more." Where only one item is intended, the phrase "only one" or similar language is used. Also, as used herein, the terms "has," "have," "having," and similar terms are intended to be open-ended terms that do not limit an element that they modify (for example, an element "having" A may also have B). Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (for example, if used in combination with "either" or "only one of").

What is claimed is:

1. A user equipment (UE) for wireless communication, comprising:
   a processing system that includes one or more processors and one or more memories coupled with the one or more processors, the processing system configured to cause the UE to:
   receive an indication of a power saving mode of a network entity; and
   communicate with the network entity based at least in part on the power saving mode, wherein, to cause the UE to communicate with the network entity based at least in part on the power saving mode, the processing system is configured to cause the UE to one or more of:
   monitor for a wake-up signal with a periodicity that is based at least in part on the power saving mode, or
   transmit or receive one or more communications via a set of component carriers that are based at least in part on the power saving mode.

2. The UE of claim 1, wherein, to cause the UE to communicate with the network entity based at least in part on the power saving mode, the processing system is configured to cause the UE to transmit uplink control information via control channel resources that are based at least in part on the power saving mode.

3. The UE of claim 1, wherein the power saving mode is associated with a set of wake-up signal occasions, and
   wherein the wake-up signal has the periodicity based at least in part on the set of wake-up signal occasions.

4. The UE of claim 1, wherein the wake-up signal is associated with downlink control information, and
   wherein the wake-up signal comprises a sequence-based signal based at least in part on the power saving mode.

5. The UE of claim 4, wherein the wake-up signal comprises a two-stage wake-up signal,
   wherein a first stage of the two-stage wake-up signal comprises the sequence-based signal, and
   wherein a second stage of the two-stage wake-up signal comprises the downlink control information.

6. The UE of claim 1, wherein a configuration of repetitions associated with the wake-up signal is based at least in part on the power saving mode.

7. The UE of claim 1, wherein the wake-up signal comprises one or more of:
   an indication of a bandwidth associated with a subsequent communication with the network entity,
   an indication of antenna switching for the subsequent communication with the network entity, or
   an indication of an update to the power saving mode for communicating with the network entity.

8. The UE of claim 2, wherein the control channel resources are associated with semi-persistent-scheduling (SPS)-based resources, and
   wherein one or more of the SPS-based resources are deactivated based at least in part on the power saving mode.

9. The UE of claim 8, wherein the one or more of the SPS-based resources are configured to serve collided hybrid automatic repeat request (HARQ) acknowledgment (HARQ-ACK) feedback.

10. The UE of claim 2, wherein, to cause the UE to transmit the uplink control information via the control channel resources, the processing system is configured to cause the UE to:
    transmit a first set of uplink control information messages based at least in part on the first set of uplink control information messages having a payload that satisfies a power-saving-mode-based payload threshold, or
    cancel a transmission of a second set of uplink control information messages based at least in part on the second set of uplink control information messages having a payload that fails to satisfy the power saving-mode-based payload threshold.

11. The UE of claim 1, wherein, to cause the UE to transmit or receive the one or more communications via the set of component carriers, the processing system is configured to cause the UE to:
    deactivate an additional set of component carriers.

12. The UE of claim 11, wherein the processing system is further configured to cause the UE to:
    receive an indication of associations of component carriers with the set of component carriers or the additional set of component carriers.

13. The UE of claim 1, wherein the processing system is further configured to cause the UE to:
    receive an indication of one or more component carrier power saving modes for one or more of the set of component carriers,
       wherein, to cause the UE to transmit or receive the one or more communications via the set of component carriers, the processing system is configured to cause the UE to apply levels of power saving, associated with the one or more component carrier power saving modes, to the one or more of the set of component carriers.

14. The UE of claim 1, wherein, to cause the UE to transmit or receive the one or more communications via the set of component carriers, the processing system is configured to cause the UE to:
    cancel component carrier switching based at least in part on the power saving mode.

15. The UE of claim 1, wherein the processing system is further configured to cause the UE to:

receive an indication to associate, with the power saving mode, one or more of:
  the periodicity associated with monitoring for the wake-up signal,
  control channel resources associated with transmitting uplink control information, or
  the set of component carriers associated with transmitting or receiving the one or more communications.

16. A network entity for wireless communication, comprising:
  at least one processor; and
  a processing system that includes one or more processors and one or more memories coupled with the one or more processors, the processing system configured to cause the network entity to:
    transmit an indication of a power saving mode of the network entity for communicating with a user equipment (UE); and
    communicate with the UE based at least in part on the power saving mode, wherein, to cause the network entity to communicate with UE based at least in part on the power saving mode, the processing system is configured to cause the network entity to one or more of:
      transmit a wake-up signal via resources having a periodicity that is based at least in part on the power saving mode, or
      transmit or receive one or more communications via a set of component carriers that are based at least in part on the power saving mode.

17. The network entity of claim 16, wherein the power saving mode is associated with a set of wake-up signal occasions, and
  wherein the wake-up signal has the periodicity based at least in part on the set of wake-up signal occasions.

18. The network entity of claim 16, wherein the wake-up signal is associated with downlink control information, and
  wherein the wake-up signal comprises a sequence-based signal based at least in part on the power saving mode.

19. The network entity of claim 18, wherein the wake-up signal comprises a two-stage wake-up signal,
  wherein a first stage of the two-stage wake-up signal comprises the sequence-based signal, and
  wherein a second stage of the two-stage wake-up signal comprises the downlink control information.

20. The network entity of claim 16, wherein a configuration of repetitions associated with the wake-up signal is based at least in part on the power saving mode.

21. The network entity of claim 16, wherein the wake-up signal comprises one or more of:
  an indication of a bandwidth associated with a subsequent communication with the network entity,
  an indication of antenna switching for the subsequent communication with the network entity, or
  an indication of an update to the power saving mode for communicating with the network entity.

22. The network entity of claim 16,
  wherein, to cause the network entity to communicate with the UE based at least in part on the power saving mode, the processing system is configured to cause the network entity to receive uplink control information via control channel resources that are based at least in part on the power saving mode.

23. The network entity of claim 22, wherein the control channel resources are associated with semi-persistent-scheduling (SPS)-based resources,
  wherein one or more of the SPS-based resources are deactivated based at least in part on the power saving mode, and
  wherein the one or more of the SPS-based resources are configured to serve collided hybrid automatic repeat request (HARQ) acknowledgment (HARQ-ACK) feedback.

24. The network entity of claim 22, wherein to cause the network entity to receive the uplink control information via the control channel resources, the processing system is configured to cause the network entity to:
  receive a first set of uplink control information messages based at least in part on the first set of uplink control information messages having a payload that satisfies a power-saving-mode-based payload threshold, or
  fail to receive a transmission of a second set of uplink control information messages based at least in part on the second set of uplink control information messages having a payload that fails to satisfy the power-saving-mode-based payload threshold.

25. The network entity of claim 16, wherein to cause the network entity to transmit or receive the one or more communications via the set of component carriers, the processing system is configured to cause the network entity to:
  deactivate an additional set of component carriers.

26. The network entity of claim 25, wherein the processing system is further configured to cause the network entity to:
  transmit an indication of associations of component carriers with the set of component carriers or the additional set of component carriers.

27. The network entity of claim 16, wherein the processing system is further configured to cause the network entity to:
  transmit an indication of one or more component carrier power saving modes for one or more of the set of component carriers,
    wherein, to cause the network entity to transmit or receive the one or more communications via the set of component carriers, the processing system is configured to cause the network entity to apply a level of power saving, associated with the one or more component carrier power saving modes, to the one or more of the set of component carriers.

28. The network entity of claim 16, wherein the processing system is further configured to cause the network entity to:
  transmit an indication to associate, with the power saving mode, one or more of:
    the periodicity associated with monitoring for the wake-up signal,
    control channel resources associated with transmitting uplink control information, or
    the set of component carriers associated with transmitting or receiving the one or more communications.

29. A method of wireless communication performed by a user equipment (UE), comprising:
  receiving an indication of a power saving mode of a network entity; and
  communicating with the network entity based at least in part on the power saving mode, the communicating comprising one or more of:
    monitoring for a wake-up signal with a periodicity that is based at least in part on the power saving mode, or transmitting or receiving one or more communications via a set of component carriers that are based at least in part on the power saving mode.

30. A method of wireless communication performed by a network entity, comprising:
- transmitting an indication of a power saving mode of the network entity for communicating with a user equipment (UE); and
- communicating with the UE based at least in part on the power saving mode, the communicating comprising one or more of:
  - transmitting a wake-up signal via resources having a periodicity that is based at least in part on the power saving mode, or
  - transmitting or receiving one or more communications via a set of component carriers that are based at least in part on the power saving mode.

* * * * *